(12) United States Patent
Bian et al.

(10) Patent No.: US 11,399,461 B2
(45) Date of Patent: Aug. 2, 2022

(54) HANDLE ASSEMBLY FOR GARDEN TOOL AND GARDEN TOOL HAVING SAME

(71) Applicant: Suzhou Cleva Precision Machinery & Technology Co., Ltd., Suzhou (CN)

(72) Inventors: Xiaoxian Bian, Suzhou (CN); Juan Wei, Suzhou (CN); Tianrong Zhang, Suzhou (CN)

(73) Assignee: Suzhou Cleva Precision Machinery and Technology Co., Ltd., Suzhou (CN)

( * ) Notice: Subject to any disclaimer, the term of this patent is extended or adjusted under 35 U.S.C. 154(b) by 144 days.

(21) Appl. No.: 16/758,468

(22) PCT Filed: Oct. 24, 2018

(86) PCT No.: PCT/CN2018/111598
§ 371 (c)(1),
(2) Date: Apr. 23, 2020

(87) PCT Pub. No.: WO2019/080859
PCT Pub. Date: May 2, 2019

(65) Prior Publication Data
US 2020/0337230 A1   Oct. 29, 2020

(30) Foreign Application Priority Data

Oct. 24, 2017 (CN) .......................... 201711002705.7
Mar. 22, 2018 (CN) .......................... 201810240598.X
(Continued)

(51) Int. Cl.
*A01D 34/82* (2006.01)
*A01D 34/416* (2006.01)
(Continued)

(52) U.S. Cl.
CPC ......... *A01D 34/824* (2013.01); *A01D 34/416* (2013.01); *A01D 34/475* (2013.01); *A01G 3/06* (2013.01); *A01B 1/00* (2013.01)

(58) Field of Classification Search
CPC ........................... A01D 34/416; A01D 34/824
See application file for complete search history.

(56) References Cited

U.S. PATENT DOCUMENTS 3,696,593 A * 10/1972 Thorud .............. A01D 34/6818
56/17.5
4,727,828 A * 3/1988 Ueno ........................ F01N 1/08
123/185.3
(Continued)

FOREIGN PATENT DOCUMENTS

CN     102126200 A    7/2011
CN     105464873 A    4/2016
(Continued)

OTHER PUBLICATIONS

International Search Report for Application No. PCT/CN/2018/111598, dated Jan. 30, 2019 with English Translation.

*Primary Examiner* — Adam J Behrens
(74) *Attorney, Agent, or Firm* — JK Intellectual Property Law, PA

(57) ABSTRACT

A handle assembly for a garden tool includes a housing having a gripping portion defining an extension direction, the housing defining a cavity for detachably mounting a battery pack, the battery pack being configured to be inserted into the cavity along the extension direction of the gripping portion. A related garden tool includes a link assembly; a working mechanism arranged at one end of the link assembly; and a power mechanism arranged at the other end of the link assembly. The power mechanism includes a gasoline (Continued)

engine with an electric starting system having a starting motor powered by the battery pack.

18 Claims, 19 Drawing Sheets

(30) Foreign Application Priority Data

| | | |
|---|---|---|
| Apr. 11, 2018 | (CN) | ........................ 201721379832.4 |
| Jun. 5, 2018 | (CN) | ........................ 201810569599.9 |
| Jun. 5, 2018 | (CN) | ........................ 201820868449.3 |
| Jun. 5, 2018 | (CN) | ........................ 201820869697.X |
| Jul. 3, 2018 | (CN) | ........................ 201810717047.8 |
| Jul. 3, 2018 | (CN) | ........................ 201810720022.3 |
| Jul. 3, 2018 | (CN) | ........................ 201810720061.3 |
| Jul. 3, 2018 | (CN) | ........................ 201821039903.0 |
| Jul. 3, 2018 | (CN) | ........................ 201821039998.6 |
| Jul. 3, 2018 | (CN) | ........................ 201821040029.2 |
| Jul. 3, 2018 | (CN) | ........................ 201821040388.8 |
| Jul. 3, 2018 | (CN) | ........................ 201821040389.2 |
| Jul. 3, 2018 | (CN) | ........................ 201821041067.X |
| Jul. 3, 2018 | (CN) | ........................ 201821087957.4 |

(51) Int. Cl.
*A01D 34/47* (2006.01)
*A01G 3/06* (2006.01)
*A01B 1/00* (2006.01)

(56) References Cited

U.S. PATENT DOCUMENTS

| | | | | |
|---|---|---|---|---|
| 5,351,565 A | * | 10/1994 | Wada | ................... A01D 34/90 192/42 |
| 9,385,403 B2 | * | 7/2016 | Stokes | ................ H01M 10/488 |
| 10,819,192 B2 | * | 10/2020 | Gurr | ........................ B25F 5/00 |
| 2004/0177512 A1 | * | 9/2004 | Lin | ............................ B25F 5/02 30/122 |
| 2005/0022391 A1 | * | 2/2005 | Heyman | ............ A01D 34/6818 30/276 |
| 2006/0070752 A1 | * | 4/2006 | Amor | ..................... A01B 1/065 172/41 |
| 2007/0131436 A1 | * | 6/2007 | Asay | ...................... A01B 1/065 172/41 |
| 2009/0113724 A1 | * | 5/2009 | Wied | .................... A01D 34/416 30/276 |
| 2010/0221590 A1 | * | 9/2010 | Reber | ...................... B25F 5/02 429/99 |
| 2010/0221594 A1 | * | 9/2010 | Ro | ............................ B25F 5/02 429/100 |
| 2014/0047719 A1 | * | 2/2014 | Shimizu | ................. A01G 3/053 30/216 |
| 2014/0096988 A1 | * | 4/2014 | Hirabayashi | .............. B25F 5/00 173/20 |
| 2015/0163987 A1 | * | 6/2015 | Lipscomb | ................ A01B 1/16 172/41 |
| 2016/0318171 A1 | * | 11/2016 | Gonzales | ................. B25G 1/04 |
| 2016/0336557 A1 | * | 11/2016 | Miller | ................... H01M 50/20 |
| 2017/0079215 A1 | * | 3/2017 | Bian | ....................... A01G 3/08 |
| 2021/0076572 A1 | * | 3/2021 | Lam | ...................... A01G 3/037 |

FOREIGN PATENT DOCUMENTS

| | | | | |
|---|---|---|---|---|
| CN | 106900268 A | 6/2017 | | |
| CN | 106973618 A | 7/2017 | | |
| CN | 107787667 A | 3/2018 | | |
| JP | 2014147354 A | * | 8/2014 | ............ A01G 3/053 |
| JP | 2015082991 A | 4/2015 | | |

* cited by examiner

HANDLE ASSEMBLY FOR GARDEN TOOL AND GARDEN TOOL HAVING SAME

CROSS-REFERENCE TO RELATED PATENT APPLICATIONS

This application is a national stage of International Application No. PCT/CN2018/111598, filed on Oct. 24, 2018 which claims priority to CN 201820869697.X, filed Jun. 5, 2018, CN 201810569599.9, filed Jun. 5, 2018, CN 201810717047.8, filed Jul. 3, 2018, CN 201721379832.4, filed Apr. 11, 2018 CN 201810240598.X, filed Mar. 22, 2018, CN 201820868449.3, filed Jun. 5, 2018 CN 201711002705.7, filed Oct. 24, 2017, CN 201821087957.4, filed Jul. 3, 2018 CN 201821040388.8, filed Jul. 3, 2018, CN 201821041067.X, filed Jul. 3, 2018 CN 201821040389.2, filed Jul. 3, 2018, CN 201810720061.3, filed Jul. 3, 2018 CN 201821040029.2, filed Jul. 3, 2018, CN 201821039903.0, filed Jul. 3, 2018 CN 201810720022.3, filed Jul. 3, 2018, and CN 201821039998.6, filed Jul. 3, 2018. All of the aforementioned applications are hereby incorporated by reference in their entireties.

TECHNICAL FIELD

The disclosure relates to a handle assembly and a garden tool having the same.

BACKGROUND

In a garden tool, a common structure is that the battery pack and the main control circuit board are separately placed on the whole machine, and some batteries are placed in the handle and cannot be disassembled, so it is troublesome to manufacture and assemble. Especially for the electric starting engine grass trimmer, the grass trimmer takes a gasoline engine as the power source and is provided with an electric starting system, and the battery pack and the control panel are both mounted on the engine mechanism so as to conveniently supply power to the electric starting system. However, when the grass trimmer is in use, the engine will vibrate, a large amount of heat is generated, and exhaust gas is exhausted, which have an impact on the battery pack and the control panel, resulting in the failure of the grass trimmer and affecting the service life. Therefore, it is necessary to improve the prior art to solve the above problems.

SUMMARY

An objective of the present disclosure is to provide a handle assembly which is convenient to mount and reliable to use.

Another objective of the present disclosure is to provide a garden tool which has a reliable structure and a long service life.

To achieve the above objectives or others, the present disclosure provides a handle assembly for a garden tool comprising a link assembly, the handle assembly being mounted on the link assembly; the handle assembly comprises a housing, one end of the housing is provided with a gripping portion, the other end of the housing is provided with an operating portion, the housing is provided with a cavity used for detachably mounting a battery pack, and the battery pack is configured to be inserted into the cavity along the extension direction of the link assembly.

As a further improvement of an embodiment of the present disclosure, along the extension direction of the link assembly, the operating portion is disposed at least partially on the upper side of the link assembly, and the cavity is disposed on the lower side of the link assembly.

As a further improvement of an embodiment of the present disclosure, the housing is further provided with a control panel unit, which is disposed on the lower side of the link assembly and above the cavity along the extension direction of the link assembly.

As a further improvement of an embodiment of the present disclosure, the control panel unit includes a substrate and an electrode holder disposed on the lower surface of the substrate, the battery pack includes at least two battery cells, axes of the at least two battery cells are consistent with the extension direction of the link assembly and are arranged along a direction perpendicular to the up-down direction of the link assembly, and terminals that are matched with the electrode holder to achieve electrical connection with the substrate are respectively provided on two sides of the battery pack side by side along the at least two battery cells.

The present disclosure further provides another handle assembly for a garden tool, the handle assembly comprises a housing, wherein the housing is provided with a gripping portion, the housing is provided with a cavity for detachably mounting a battery pack, and the battery pack is configured to be inserted into the cavity along the extension direction of the gripping portion.

As a further improvement of an embodiment of the present disclosure, the housing is further provided with an operating portion which is disposed at one end of the gripping portion close to the battery pack; the housing is further internally provided with a control panel unit which is arranged below the operating portion.

As a further improvement of an embodiment of the present disclosure, the control panel unit includes a substrate and an electrode holder disposed on the lower surface of the substrate, the battery pack includes at least two battery cells, axes of the at least two battery cells are consistent with the extension direction of the gripping portion, and the arrangement direction of the at least two battery cells is perpendicular to the extension direction of the gripping portion, and terminals that are matched with the electrode holder to achieve electrical connection with the substrate are respectively provided on two sides of the battery pack side by side along the at least two battery cells.

As a further improvement of an embodiment of the present disclosure, the electrode holder has a body fixed on the substrate and clamping pins extending downward along two ends of the body, the clamping pins extend into the cavity, and the battery pack is mounted in the cavity and is matched with the clamping pins to achieve electrical connection with the control panel unit.

As a further improvement of an embodiment of the present disclosure, the electrode holder is mounted in the housing, the housing is provided with a recess portion, and both the two clamping pins of the electrode holder are clamped in the recess portion.

As a further improvement of an embodiment of the present disclosure, the cavity includes an opening, a front cavity communicating with the opening, and an opposite rear cavity, the clamping pins are located in the rear cavity, the front cavity includes an opening portion communicating in a direction perpendicular to the mounting direction of the battery pack, the battery pack is mounted in the cavity, and a part of the side wall of the battery pack is exposed from the opening portion.

As a further improvement of an embodiment of the present disclosure, the side wall of the battery pack is provided with a rubber coating, and the rubber coating is exposed from the opening portion.

As a further improvement of the embodiment of the present disclosure, the clamping pins at the two ends of the body are correspondingly provided with a clamping pin first terminal and a clamping pin second terminal which protrude towards the inside of the cavity, the battery pack is provided with a battery first terminal and a battery second terminal which are respectively matched with the clamping pin first terminal and the clamping pin second terminal, and the battery first terminal and the battery second terminal are respectively arranged at two sides of the end portion of the battery pack.

As a further improvement of the embodiment of the present disclosure, one of the battery pack and the side wall of the cavity is provided with a guiding groove, the other of the battery pack and the inner wall of the cavity is provided with a guiding protrusion, the battery pack is mounted in the cavity through the matching of the guiding groove and the guiding protrusion, and the guiding groove or the guiding protrusion corresponds to the position of the battery first terminal and/or the battery second terminal.

As a further improvement of the embodiment of the present disclosure, the rear wall of the cavity is provided with a cavity third terminal, the end of the battery pack adjacent to the battery first terminal and the battery second terminal is provided with a battery third terminal matched with the cavity third terminal, and the control panel unit is connected to the detection module in the battery pack through the matching of the cavity third terminal and the battery third terminal.

As a further improvement of the embodiment of the present disclosure, one of the lower wall of the cavity and the battery pack is provided with a third guiding protrusion, the other of the lower wall of the cavity and the battery pack is provided with a third guiding groove matched with the third guiding protrusion, and the third guiding protrusion or the third guiding groove corresponds to the position of the cavity third terminal or the battery third terminal.

As a further improvement of an embodiment of the present disclosure, the electrode holder is an integrated structure, and the body and the clamping pins at two ends thereof are arranged in a U shape.

As a further improvement of an embodiment of the present disclosure, the material of the electrode holder is a flame retardant material.

As a further improvement of the embodiment of the present disclosure, the clamping pin first terminal and the clamping pin second terminal are respectively provided with a first fixing member, and the clamping pins at two ends of the body are respectively provided with a second fixing member matched with the first fastening member.

As a further improvement of the embodiment of the present disclosure, one of the first fixing member and the second fixing member is a positioning hole, and the other is a positioning post.

As a further improvement of an embodiment of the present disclosure, the electrode holder and the substrate are fixedly connected by a third fixing member.

As a further improvement of an embodiment of the present disclosure, the third fixing member is a rivet.

As a further improvement of an embodiment of the present disclosure, the substrate is provided with a substrate positioning hole, the body of the electrode holder is provided with a substrate positioning post, and the substrate positioning hole is matched with the substrate positioning post for positioning the electrode holder and the substrate.

As a further improvement of an embodiment of the present disclosure, the upper end of the clamping pin first terminal is provided with a first electrode inserting piece, the upper end of the clamping pin second terminal is provided with a second electrode inserting piece, electrode holes are provided at positions on the substrate corresponding to the clamping pin first terminal and the clamping pin second terminal, and the first electrode inserting piece and the second electrode inserting piece respectively penetrate through the corresponding electrode holes to be connected to the substrate in a welding manner.

As a further improvement of an embodiment of the present disclosure, each of the first electrode inserting piece and the second electrode inserting piece includes two pins, and the first electrode inserting piece and the second electrode inserting piece are respectively welded to the substrate at two points through the two pins.

As a further improvement of an embodiment of the present disclosure, the cavity third terminal is provided with a wire portion, and the cavity third terminal is connected to the substrate through the wire portion.

As a further improvement of the embodiment of the present disclosure, the battery pack further includes a charging port, the charging port is disposed on a bottom side surface of the battery pack, the charging port includes a charging negative electrode port and a charging positive electrode port, which are electrically connected to the control panel unit, respectively, wherein the charging negative electrode port and the charging positive electrode port are disposed at an interval, and the outer contour of the charging negative electrode port is different from the outer contour of the charging positive electrode port.

As a further improvement of an embodiment of the present disclosure, the battery pack is further provided with at least one temperature sensor electrically connected to the control panel unit, respectively.

As a further improvement of an embodiment of the present disclosure, the battery pack further includes a vibration damper made of elastic material.

As a further improvement of an embodiment of the present disclosure, the damping member includes a first damping member and a second damping member, and each of the left side surface and the right side surface of the battery pack is provided with at least two first damping members; the top side surface of the battery pack is provided with at least one second vibration damper.

As a further improvement of an embodiment of the present disclosure, the battery pack further includes a battery pack housing for mounting the battery cells, the battery pack housing includes an upper cover and a lower cover that are connected in a snap-fit manner, the first vibration damper includes a first outer end protruding at least partially from the outer surface of the lower cover, and further includes a first inner end protruding at least partially from the inner surface of the lower cover, and the inner end surface of the first inner end abuts against the battery cells; when the battery pack is mounted into the cavity, the outer end face of the first outer end abuts against the inner wall of the cavity, and at this time, the first vibration damper is sandwiched between the inner wall of the cavity and the battery cells.

As a further improvement of the embodiment of the present disclosure, the second vibration damper is embedded in the top side surface of the lower cover, the second vibration damper includes a second outer end at least partially protruding from the outer surface of the lower cover, and further includes a second inner end at least partially protruding from the inner surface of the lower cover, the inner end surface of the second inner end is provided with an arc surface corresponding to the radian of the outer surface of the battery cells, and the arc surface abuts against the battery cells; when the battery pack is mounted into the cavity, the outer end surface of the second outer end abuts against the inner wall of the cavity, and the second vibration damper is clamped between the inner wall of the cavity and the battery cells.

As a further improvement of the embodiment of the present disclosure, the first outer end of the first vibration damper is smaller than the first inner end of the first vibration damper, and the second outer end of the second vibration damper is smaller than the second inner end of the second vibration damper.

As a further improvement of an embodiment of the present disclosure, the lower portion of the cavity is provided with a battery operating mechanism, the operating mechanism includes an operating key and a reset member pressing against the operating key, the battery pack is provided with a groove portion matching with the operating key, and the operating key is clamped with the groove portion under the action of the reset member to lock the battery pack in the cavity.

As a further improvement of an embodiment of the present disclosure, the operating key includes a hook portion matched with the groove portion, a pressing portion far away from the hook portion, and a rotating shaft located between the hook portion and the pressing portion, the reset member abuts against the pressing portion to keep the hook portion clamped in the groove portion, and the battery pack is locked relative to the cavity; the pressing portion can be operated to overcome the acting force of the reset member to enable the hook portion to be separated from the groove portion, and the battery pack is unlocked relative to the cavity.

As a further improvement of an embodiment of the present disclosure, the rear wall of the cavity is provided with an elastic member, the battery pack is locked relative to the cavity, and the battery pack presses against the elastic member and causes the elastic member to store energy; the battery pack is unlocked relative to the cavity, and the elastic member releases elasticity to drive the battery pack to move outwards from the cavity.

As a further improvement of an embodiment of the present disclosure, the elastic member is configured as a cavity third terminal, the battery pack is provided with a battery third terminal matched with the cavity third terminal, and the control panel unit is connected with the detection module in the battery pack through the matching of the cavity third terminal and the battery third terminal.

As a further improvement of one embodiment of the present disclosure, the groove portion includes a first groove and a second groove that are able to be matched with the hook portion, the first groove is closer to a protruding end of the battery pack than the second groove, and when the hook portion is clamped into the first groove, the battery pack is locked and mounted in the cavity; when the hook portion is clamped into the second groove, the battery pack can be drawn out of the cavity.

As a further improvement of an embodiment of the present disclosure, the side wall of the first groove away from the protruding end of the battery pack is a plane, the included angle between this side wall and the top side surface of the battery pack is not greater than 90°, or this side wall is a curved surface, then the minimum included angle between the tangent plane of this side wall and the top side surface of the battery pack is not greater than 90°; the side wall of the second groove away from the extending end of the battery pack is a plane, the included angle between this side wall and the top side surface of the battery pack is not less than 120°, or this side wall is a curved surface, then the maximum included angle between the tangent plane of this side wall and the top side surface of the battery pack is not less than 120°.

The disclosure further provides a garden tool, which comprises a link assembly, a working mechanism arranged at one end of the link assembly and a power mechanism arranged at the other end of the link assembly, wherein the power mechanism comprises a gasoline engine, the gasoline engine comprises an electric starting system, the electric starting system comprises a starting motor, and the battery pack supplies power to the starting motor; the garden tool further comprises a handle assembly as described in any one of the above embodiments, and the handle assembly is located the position, between the working mechanism and the power mechanism, adjacent the power mechanism.

As a further improvement of one embodiment of the disclosure, the garden tool is an electric starting engine grass trimmer.

The disclosure also provides another garden tool which comprises a working mechanism and a power mechanism, wherein the power mechanism comprises a gasoline engine, the gasoline engine comprises an electric starting system, and the electric starting system comprises a starting motor; the garden tool further comprises a handle assembly as described in any one of the embodiments above; the battery pack supplies power to the starting motor.

As a further improvement of one embodiment of the disclosure, the garden tool is an electric starting gasoline blowing-suction machine.

As a further improvement of an embodiment of the present disclosure, the opening of the cavity faces the working mechanism.

As a further improvement of an embodiment of the present disclosure, the gasoline engine further comprises one or more of an electronic fuel injection system, an electronic ignition system, and an automatic throttle system, and the battery pack supplies power to one or more of the electronic fuel injection system, the electronic ignition system, and the automatic throttle system.

Beneficial Effect

It can be seen from the above technical solutions that the present disclosure has a plurality of outstanding substantial technical features, and after the technical solution of the present disclosure is implemented, the significant technical progress is mainly reflected in that:

(1) through mounting the battery pack to the control panel unit, the battery pack can be fixed relative to the substrate, and is not affected by vibration when using the tool, therefore the battery pack and the control panel unit can be protected, and tool failure caused thereby can be prevented from being unavailable, and the battery pack has a compact mounting structure, and can also be disassembled by one hand, so that it is more convenient for users.

(2) through arranging the battery pack mounting structure at the handle assembly, and also arranging the operating portion at the handle assembly, the operation of the tool can be carried out when be gripped, and the battery pack, the control panel unit and the operating portion are arranged together, so that the trouble of wiring is reduced, and the assembling is more simple and convenient, the cost is low and the use is reliable.

(3) through arranging the handle assembly between the working mechanism and the power mechanism, the battery pack and the control panel unit can be protected from the vibration of the power mechanism and the resulting heat, and the handle assembly is located at the front of the power mechanism, so that it will not be affected by the waste gas produced by that power mechanism, thereby reducing the failure of the garden tool caused by the vibration and heat, so as to make the use more reliable and the services life of the garden tool longer.

(4) in case of the garden tool having a long handle, the tool is usually rotated around the portion to be held as a fulcrum during operation, and the battery pack is disposed near the handle, so that the labor intensity of the operator in rotating the tool can be reduced, and the operator can use the tool more easily.

DETAILED DESCRIPTION

The present disclosure will be described in detail below with reference to embodiments shown in the accompanying drawings. However, these embodiments are not intended to limit the present disclosure, and structural and functional changes that may be made by those skilled in the art based on these embodiments are all included in the scope of the present disclosure.

Embodiment 1

Figure 1:
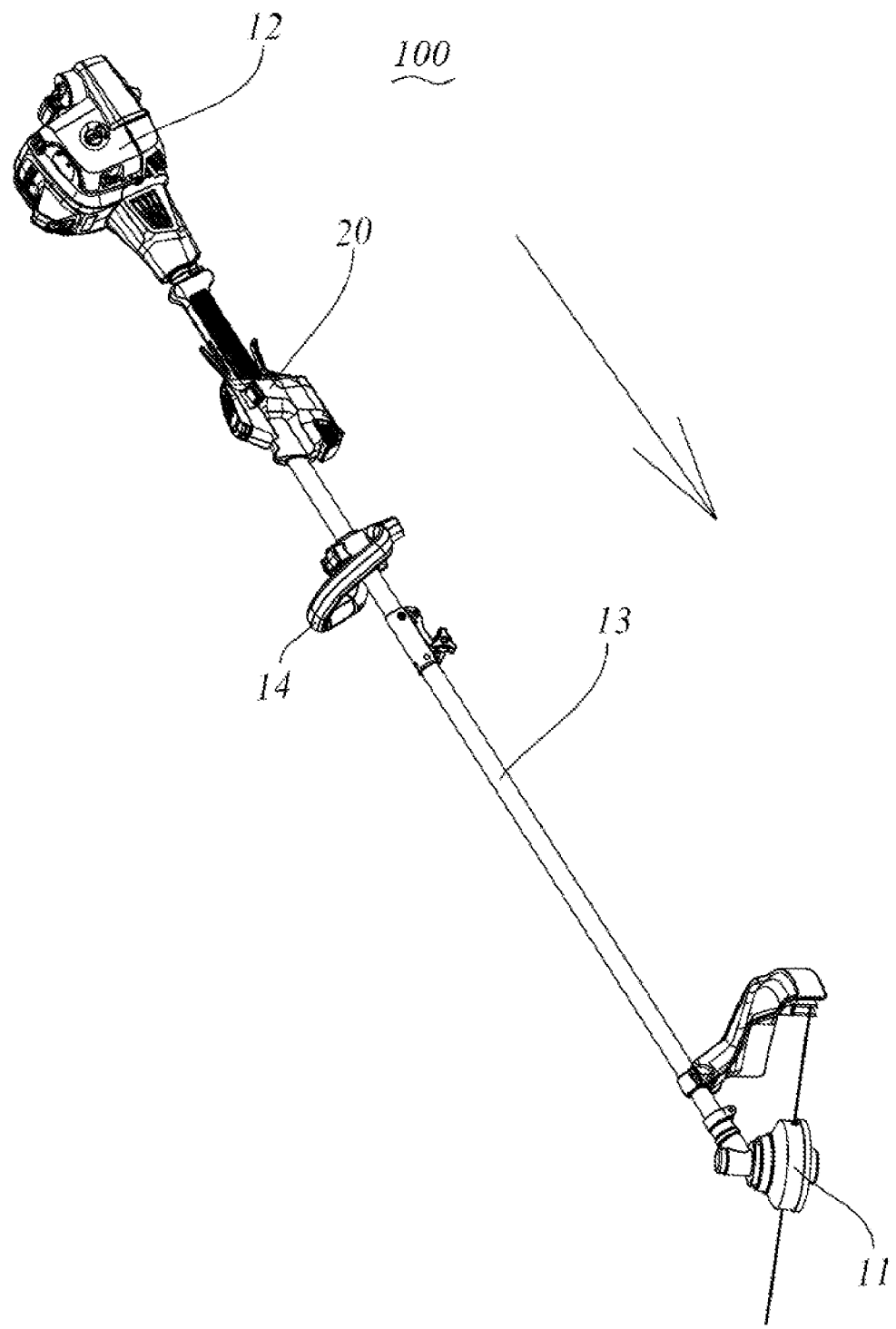
FIG. 1 is an isometric diagram of a grass trimmer according to preferred Embodiment 1 of the present disclosure.
Figure 2:
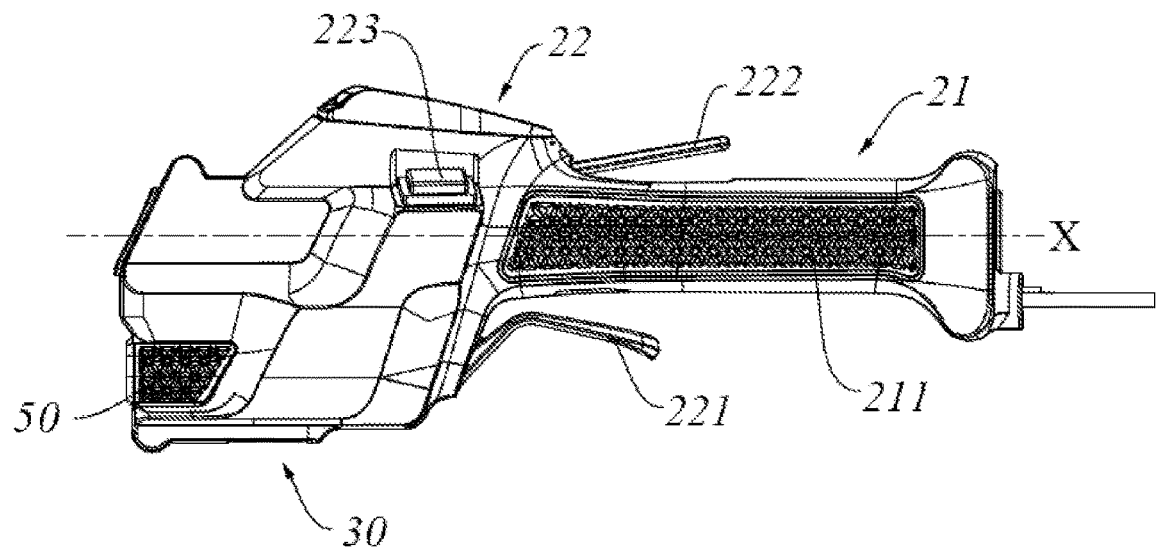
FIG. 2 is a front view of the handle assembly of the grass trimmer of FIG. 1.

The present embodiment takes a grass trimmer as an example for specific description. Referring to FIG. 1, the grass trimmer 100 includes a link assembly 13, a working mechanism 11 coupled to the front end of the link assembly 13, and a power mechanism 12 coupled to the rear end of the link assembly 13. For the front and rear ends here, the direction close to the area to be cut when the grass trimmer is operated is regarded as the front, and the direction of holding by an user or far away from the area to be cut is regarded as the rear, for example, the direction shown by the arrow in the figure is the front. In the present embodiment, the working mechanism 11 includes a housing, a cutting member disposed within the housing and rotating about an axis in a working plane, and a shield attached to the housing or to the link assembly. The grass trimmer in the present embodiment comprises a gasoline engine provided in a power mechanism 12, and the gasoline engine provides power for the working mechanism 11. In the power mechanism 12 is further provided a starting motor to realize the electric starting of the gasoline engine. In some documents, "starting motor" and "electric starting" are also referred to as "starter motor" and "electric start".

In other garden tools, the cutting member of the working mechanism may be moved linearly back and forth, rotated, or moved laterally by the staggered blades to perform the cutting action, although other mechanisms that do not perform the cutting action, such as a blowing-suction machine, are also possible. The power mechanism 12 comprises a gasoline engine which comprises an electric starting system, and power is provided through the gasoline engine to enable the power of the grass trimmer to be strong, and the grass trimmer can be used outdoors for a long time. Of course, the power mechanism may also be an electric motor and a rechargeable battery pack or AC power source to power the motor.

In the present embodiment, the link assembly 13 is provided with a battery pack 50, and the battery pack 50 mainly functions to supply power to the starting motor of the electric starting system and to discharge power only when starting the gasoline engine. Further, the battery pack 50 can also supply power to an electronic control system of the gasoline engine, such as an electronic ignition system, an electronic fuel injection system, an electric throttle system, an automatic throttle system, and the like. Still further, the battery pack may be charged while the gasoline engine is operating.

In the present embodiment, the link assembly 13 further includes two handles, a handle assembly 20 extending in a direction substantially the same as the direction of the link assembly 13, and an auxiliary handle 14 located in front of the handle assembly 20, wherein the auxiliary handle 14 can be movably connected to the link assembly 13 for facilitating position adjustment. And the power mechanism 12 is disposed at the rear end of the handle assembly 20, i.e., the handle assembly 20 is disposed between the auxiliary handle 14 and the power mechanism 12, so that the user can grip it more stably during operation. In addition, the link assembly 13 includes a telescopic connecting rod, and by adjusting the telescopic connecting rod, the distance between the handle assembly 20 and the working mechanism 11 can be adjusted.

Referring to FIGS. 2-9, the handle assembly 20 extends generally in the front-rear direction and includes a front mechanical connection port 202 and a rear mechanical connection port 203, the front mechanical connection port 202 being connected to the link assembly 13, and the rear mechanical connection port 203 being directly or indirectly connected to the power mechanism 12. The front mechanical connection port 202 and the rear mechanical connection port 203 are both configured as circular holes with centerlines of the two connection ports being collinear, as shown by axis X in FIGS. 2 and 3, so the extension direction of the handle assembly 20 coincides with the extension direction of the link assembly 13, facilitating the link assembly 13 passing through both connection ports to simplify assembly of the handle assembly 20 and the link assembly 13. The rear portion of the handle assembly 20 is configured as a gripping portion 21, the gripping portion 21 extends along the front-rear direction for a preset length, and the gripping portion 21 is further provided with a handle rubber coating 211 to facilitate the grip of the user. The front upper portion of the handle assembly 20 includes an operating portion 22, and the front lower portion of the handle assembly 20 includes a battery mounting portion 30. The link assembly 13 and the power mechanism 12 are respectively connected to the front and back of the handle assembly 20, and the control for the power mechanism 12 and the working mechanism 11 at the front end of the link assembly 13 can be realized through the operating portion 22. Specifically, the operating portion 22 is provided with a plurality of keys, such as a throttle lock key 222 extending to the upper end of the gripping portion 21, a throttle key 221 extending to the lower end of the gripping portion 21, an ignition key 225 and a misfire key 220 arranged in parallel outside the housing of the operating portion 21, a main switch key 224 located at one side of the ignition key 225 and the misfire key 220 and lower than the ignition key 225 and the misfire key 220, and the like. That is, the operating portion 22 is disposed at least partially on the upper side of the link assembly in the extension direction of the link assembly 13.

The handle assembly 20 includes a housing 201 having a Half structure, that is, the housing 201 is assembled by left and right housings which are substantially symmetrical, the operating portion 22 is disposed on the upper portion of the housing 201, the battery mounting portion 30 is disposed on the lower portion of the housing 201 and is located obliquely below the operating portion 22 for mounting the battery pack 50, the battery pack 50 is used for supplying power to the electric starting system, and the battery pack 50 may also supply power to the electronic ignition system, the electronic fuel injection system, and the like. The battery mounting portion 30 includes a battery pack mounting structure which includes a cavity 35 used for mounting the battery pack 50 and a control panel unit provided above the cavity 35, wherein the cavity 35 and the control panel unit are both arranged on the lower side of the link assembly along the extension direction of the link assembly 13, and the control panel unit is closer to the link assembly 13 than the cavity. The control panel unit has the functions of the starting motor control, the battery protection, and the like. Wherein, the cavity 35 is disposed on the housing 201 of the handle assembly 20, the control panel unit is clamped in the housing 201, the control panel unit includes a substrate 31, an electronic element disposed on the upper surface of the substrate 31, and an electrode holder 32 disposed on the lower surface of the substrate 31, the electrode holder 32 has a body 320a fixed on the substrate 31 and clamping pins 320b extending downward along two ends of the body 320a, the clamping pins 320b extend into the cavity 35, and the battery pack 50 is mounted in the cavity 35 and is electrically connected to the control panel unit by matching with the clamping pins 320b.

The front of the cavity 35 is provided with an opening 350, the cavity 35 can be divided into a front cavity 350a communicating with the opening 350 and an opposite rear cavity 350b, the clamping pins 320b extend into the rear cavity 350b, and when the battery pack 50 is mounted, the battery pack is inserted into the front cavity 350a from the opening 350 and then enters the rear cavity 350b. In order to facilitate the mount and removal of the battery pack 50, the front cavity 350a has an opening portion communicating with the outside in a direction perpendicular to the mounting direction of the battery pack 50, the battery pack 50 is mounted in the cavity 35, and a part of the side wall of the battery pack 50 is exposed from the opening portion. In the present embodiment, specifically, the front portions of the left and right side walls of the cavity 35 are free of solid side walls, so that the front ends of the left and right side walls of the battery pack 50 can be easily gripped in the mounted or dismounted state. In addition, the front ends of the left and right side walls of the battery pack 50 can be provided with rubber coating 525, so that the battery pack 50 can be conveniently gripped and can be prevented from being accidentally collided.

Figure 6:
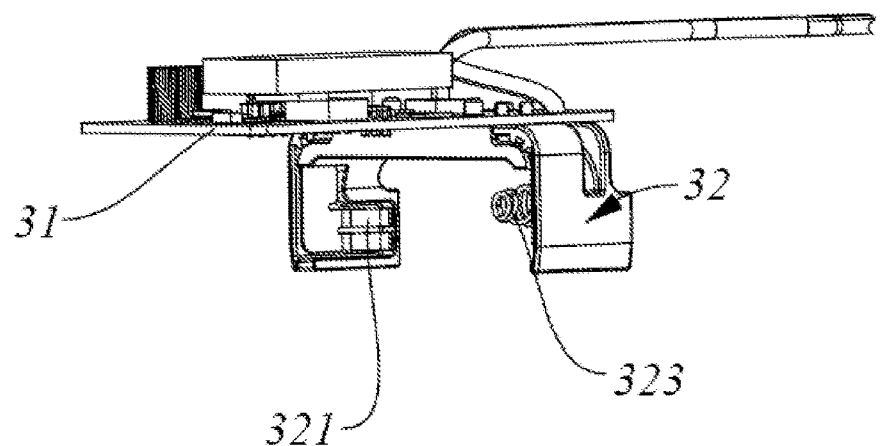
FIG. 6 is an isometric diagram of the control panel unit in the handle assembly of FIG. 3.
Figure 7:
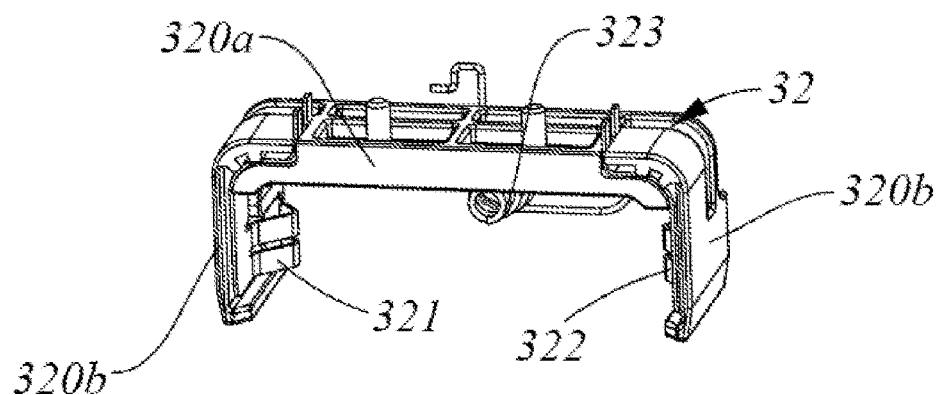
FIG. 7 is an isometric diagram of the electrode holder in the control panel unit of FIG. 6.
Figure 8:
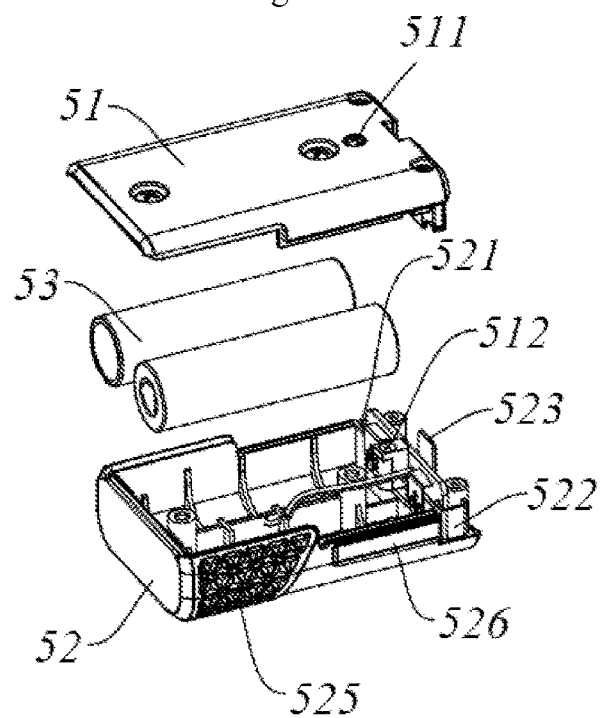
FIG. 8 is an exploded isometric view of the battery pack in the handle assembly of FIG. 3.
Figure 9:
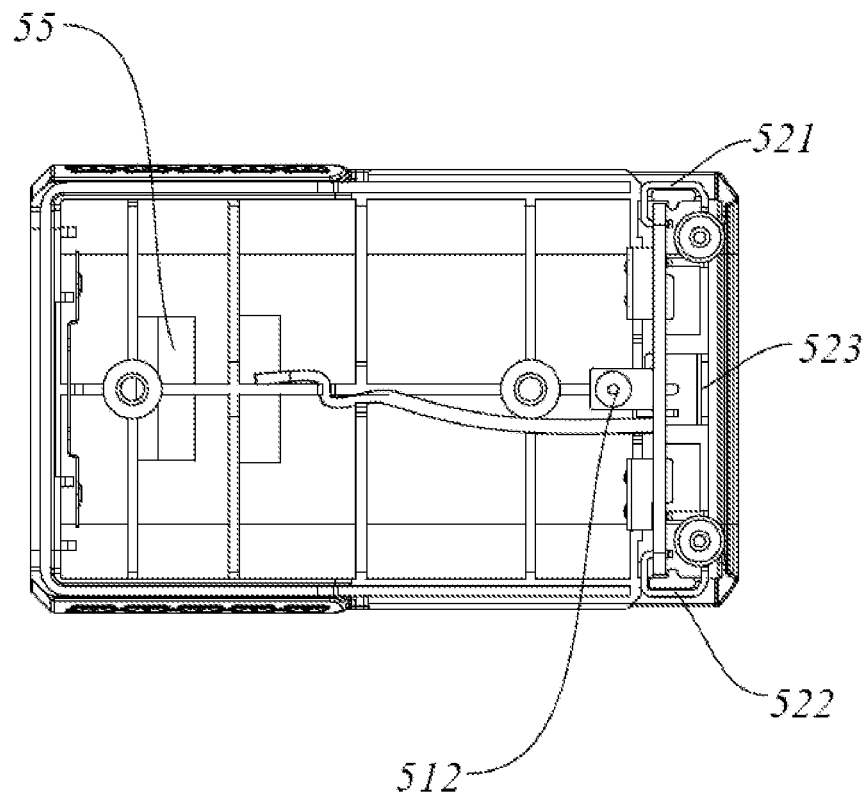
FIG. 9 is a schematic top view of the lower cover of the battery pack of FIG. 8.
Figure 10:
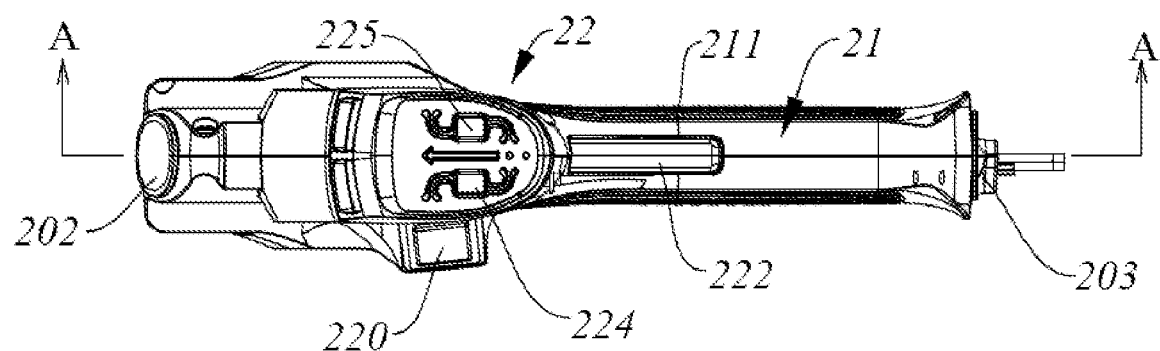
FIG. 10 is a top view of the handle assembly of FIG. 2.
Figure 11:
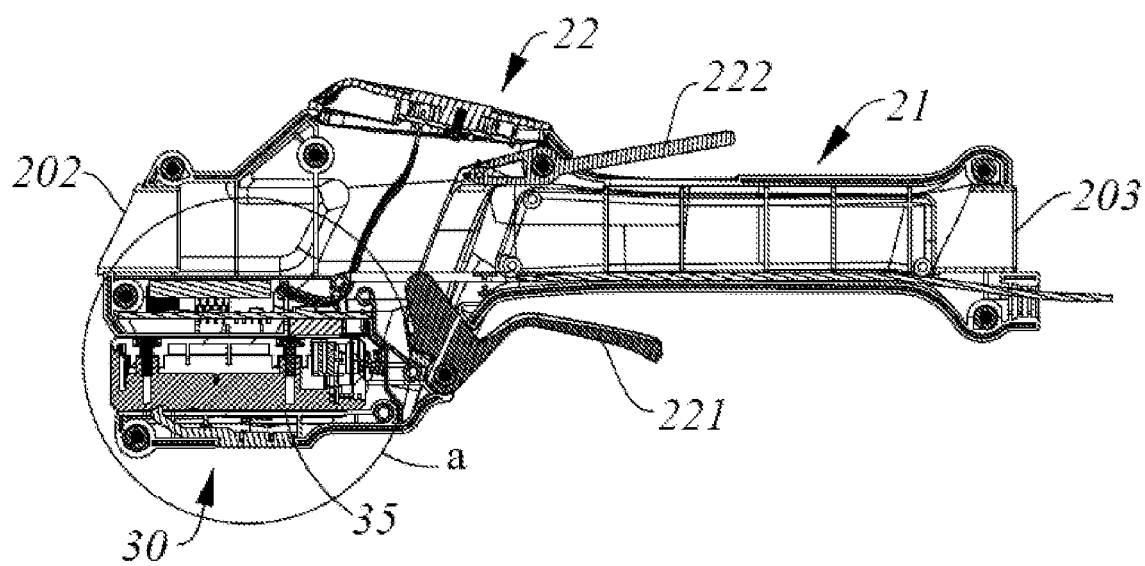
FIG. 11 is a cross-sectional view taken along direction A-A of the handle assembly of FIG. 10 with the battery pack in a locked state.
Figure 12:
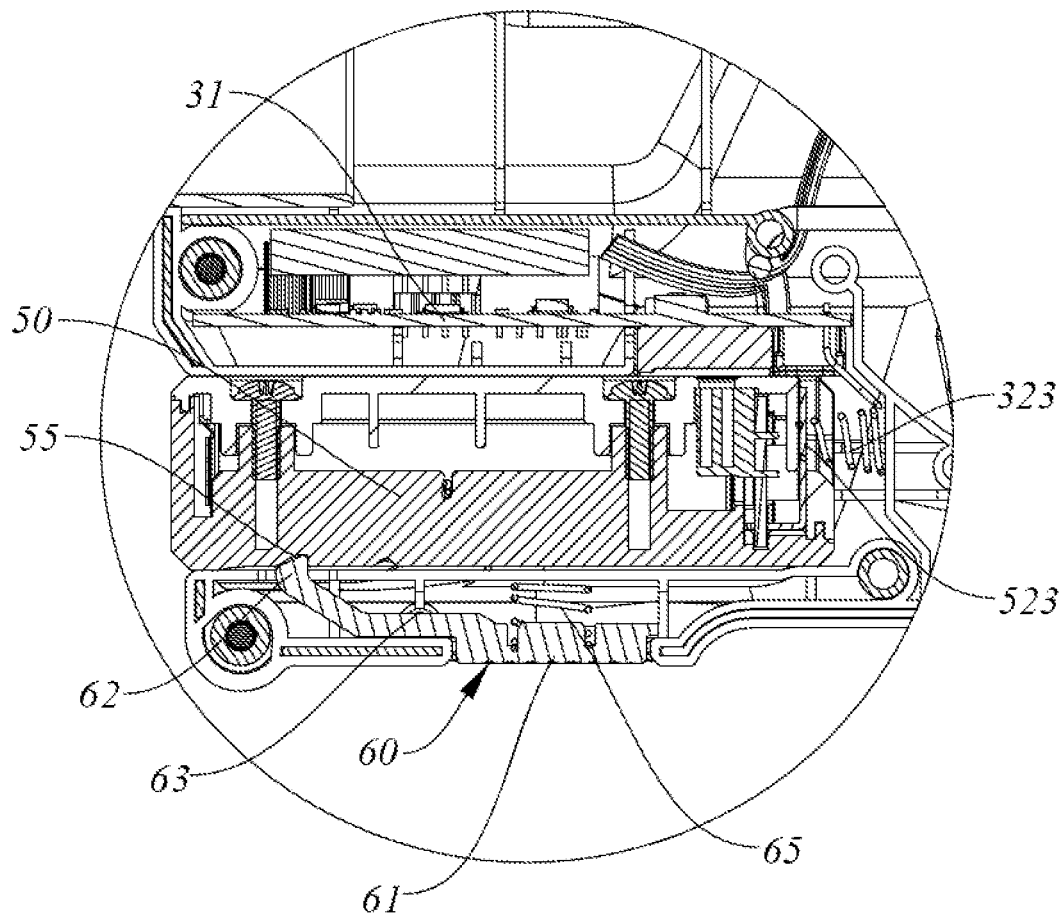
FIG. 12 is an enlarged schematic view of portion a of FIG. 11.

Referring to FIGS. 6 and 8, the clamping pins 320b at the two ends of the body of the electrode holder 32 are correspondingly provided with a clamping pin first terminal 321 and a clamping pin second terminal 322 protruding into the cavity, the battery pack 50 is provided with a battery first terminal 521 and a battery second terminal 522 respectively matched with the clamping pin first terminal 321 and the clamping pin second terminal 322, the battery first terminal 521 and the battery second terminal 522 are configured as the positive and negative electrodes of the battery pack 50 and respectively disposed at the two sides of the end of the battery pack 50, and because the clamping pin first terminal 321 and the clamping pin second terminal 322 are connected to the substrate 31 through the body 320a, when the battery pack 50 is mounted in the cavity 35, the clamping pin first terminal 321 is electrically connected to the battery first terminal 521, and the clamping pin second terminal 322 is electrically connected to the battery second terminal 522, thereby achieving the electrical connection between the battery pack 50 and the control panel unit.

Figure 5:
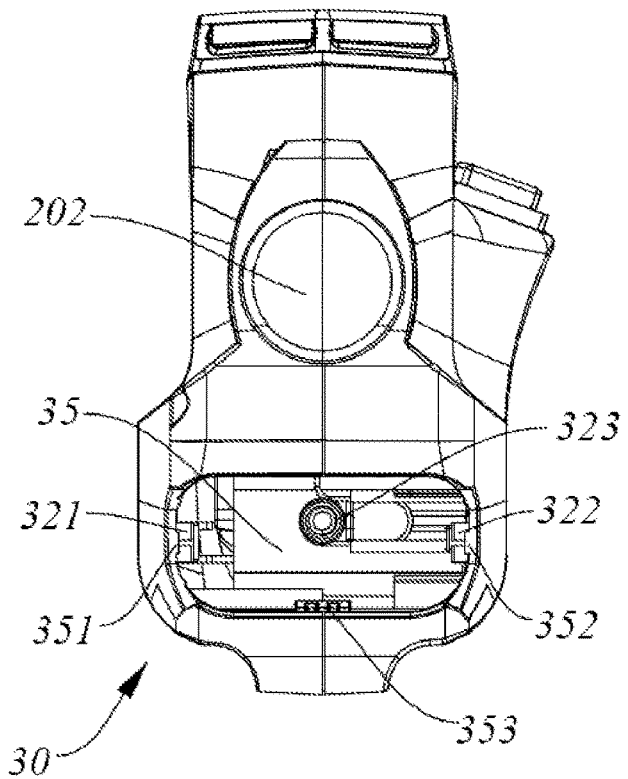
FIG. 5 is a view similar to FIG. 4 with the battery pack removed from the cavity.

Further, as shown in FIGS. 5 and 8, the left and right side walls of the cavity 35 are respectively provided with guiding protrusions 351 and 352 protruding into the cavity 35, the left and right sides of the battery pack 50 are correspondingly provided with guiding grooves 526, the battery pack is mounted into the cavity 35 through the matching guide of the guiding grooves 526 and the guiding protrusions 351 and 352, wherein the guiding grooves 526 at the two sides respectively correspond to the positions of the battery first terminal 521 and the battery second terminal 522 so as to realize the more reliable mount of the battery pack 50. In addition, the battery pack 50 includes an upper cover 51, a lower cover 52 and battery cells 53, wherein the upper cover 51 and the lower cover 52 are assembled together, the battery cells 53 are located in the upper cover 51 and the lower cover 52, the upper cover 51 is provided with a charging port 511, and the lower cover 52 is correspondingly provided with a charging electrode 512, so that the standardization of the charging port is facilitated, and the charging is more convenient through the charging and discharging ports are respectively arranged.

Figure 3:
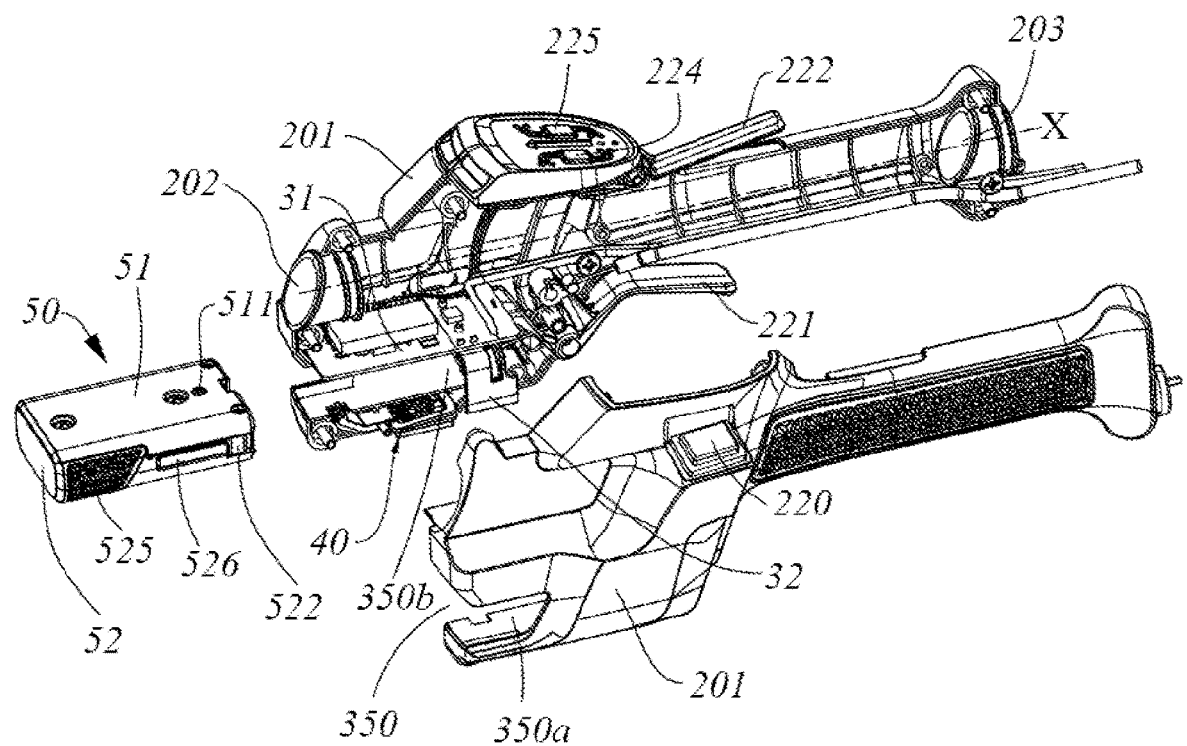
FIG. 3 is an exploded perspective view of the handle assembly of FIG. 2.
Figure 4:
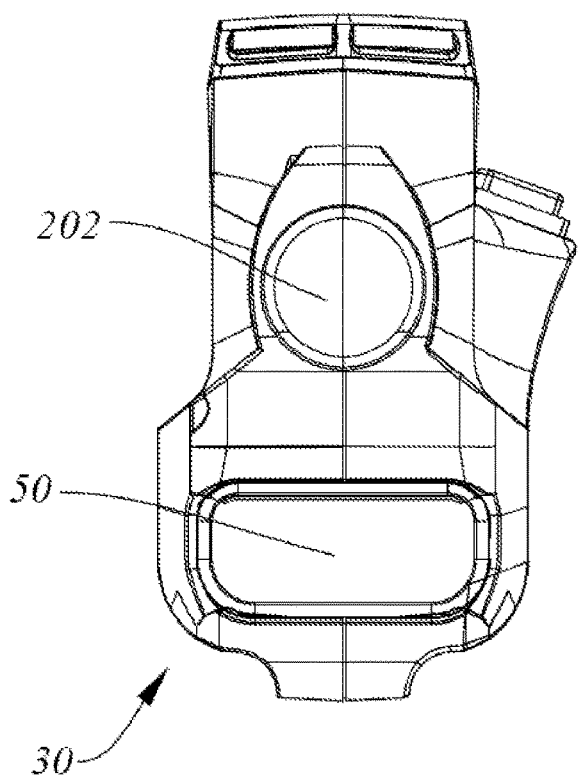
FIG. 4 is a left side view of the handle assembly of FIG. 2, wherein the battery pack is mounted in the cavity.

Referring to FIG. 8 and FIGS. 1 and 3 in cooperation, an arrangement direction of the battery cells 53 coincides with an extension direction of the handle assembly, that is, the axis of the battery cells 53 is substantially parallel to the extension direction of the handle assembly or the extension direction of the link assembly, and the battery cells 53 include at least two battery cells, in the present embodiment, the battery cells 53 are two 3.6V battery cells. And at least two battery cells 53 are arranged along the lateral direction of the handle assembly, where the side facing the working surface when the user grips the handle assembly is the lower side, and the other side is the upper side, and the direction perpendicular to the upper and lower sides and the extension direction of the handle assembly is the lateral direction, so that the battery pack 50 has a thinner thickness (about the diameter of one battery cell) in the upper and lower directions, that is, the dimension of the battery pack 50 in the upper and lower directions is smaller than that in the lateral direction. And the battery first terminal 521 and the battery second terminal 522 are respectively disposed at the two sides of the battery pack, so that the battery pack and the mounting structure thereof are thinner to reduce the overall size of the handle assembly. In the present embodiment, the rear wall of the cavity 35 is provided with a cavity third terminal 323, the corresponding end of the battery pack 50 adjacent to the battery first terminal 521 and the battery second terminal 522 is provided with a battery third terminal 523 matched with the cavity third terminal 323, and the control panel unit is connected to a detection module in the battery pack 50, for example, a temperature measurement module in the battery pack 50, through the cavity third terminal 323 and the battery third terminal 523. In addition, the lower wall of the cavity 35 is provided with a third guiding protrusion 353, the corresponding lower portion of the battery pack 50 is provided with a third groove portion (not shown) matched with the third guiding protrusion 353, the third guiding protrusion 353 corresponds to the position of the cavity third terminal 323 along the mounting direction of the battery pack 50, and the corresponding third groove portion corresponds to the position of the battery third terminal 523, so that reliable connection between the cavity third terminal 323 and the battery third terminal 523 when the battery pack 50 is mounted is facilitated.

Referring to FIGS. 10 to 14, in order to achieve the lock of the battery pack in the cavity, the battery pack mounting structure further includes an operating mechanism, the operating mechanism is disposed at the lower portion of the cavity 35, the operating mechanism includes an operating key 60 and a reset member 65 pressing against the operating key 60, the battery pack 50 is provided with a groove portion 55 matched with the operating key 60, and the operating key 60 is clamped with the groove portion 55 under the action of the reset member 65 to lock the battery pack 50 in the cavity 35. Specifically, the operating key 60 includes a hook portion 62 clamped with the groove portion 55, a pressing portion 61 away from the hook portion 62, and a rotating shaft 63 located between the hook portion 62 and the pressing portion 61, the reset member 65 outwardly presses against the pressing portion 61, and under the action of the rotating shaft 65, the hook portion 61 inwardly maintains clamping with the groove portion 55, so that the battery pack 50 is locked relative to the cavity 35.

Figure 13:
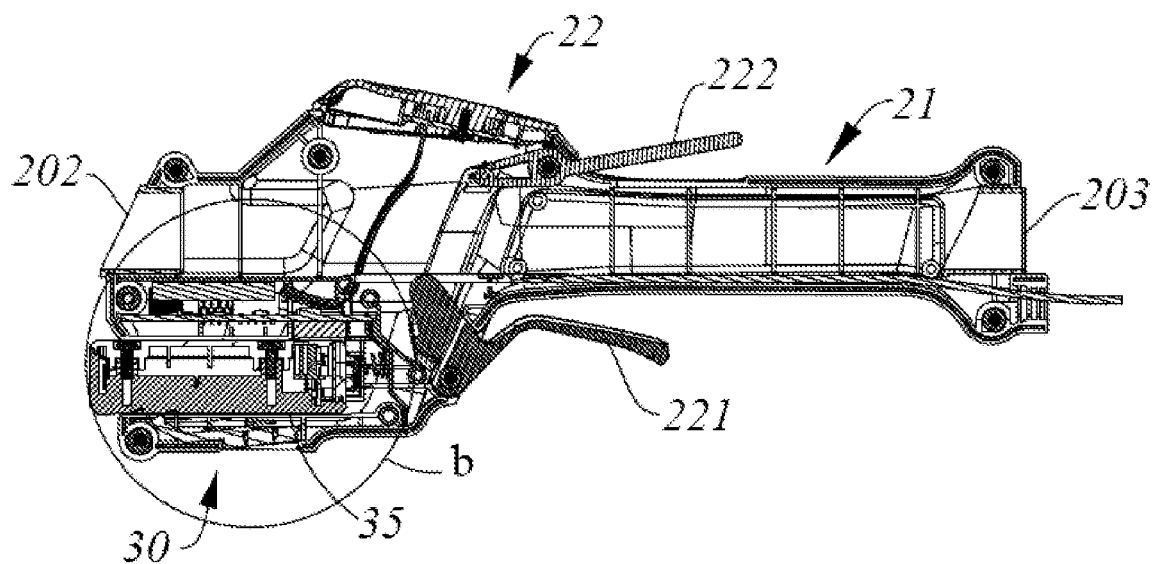
FIG. 13 is similar to FIG. 11 with the battery pack in an unlocked state.
Figure 14:
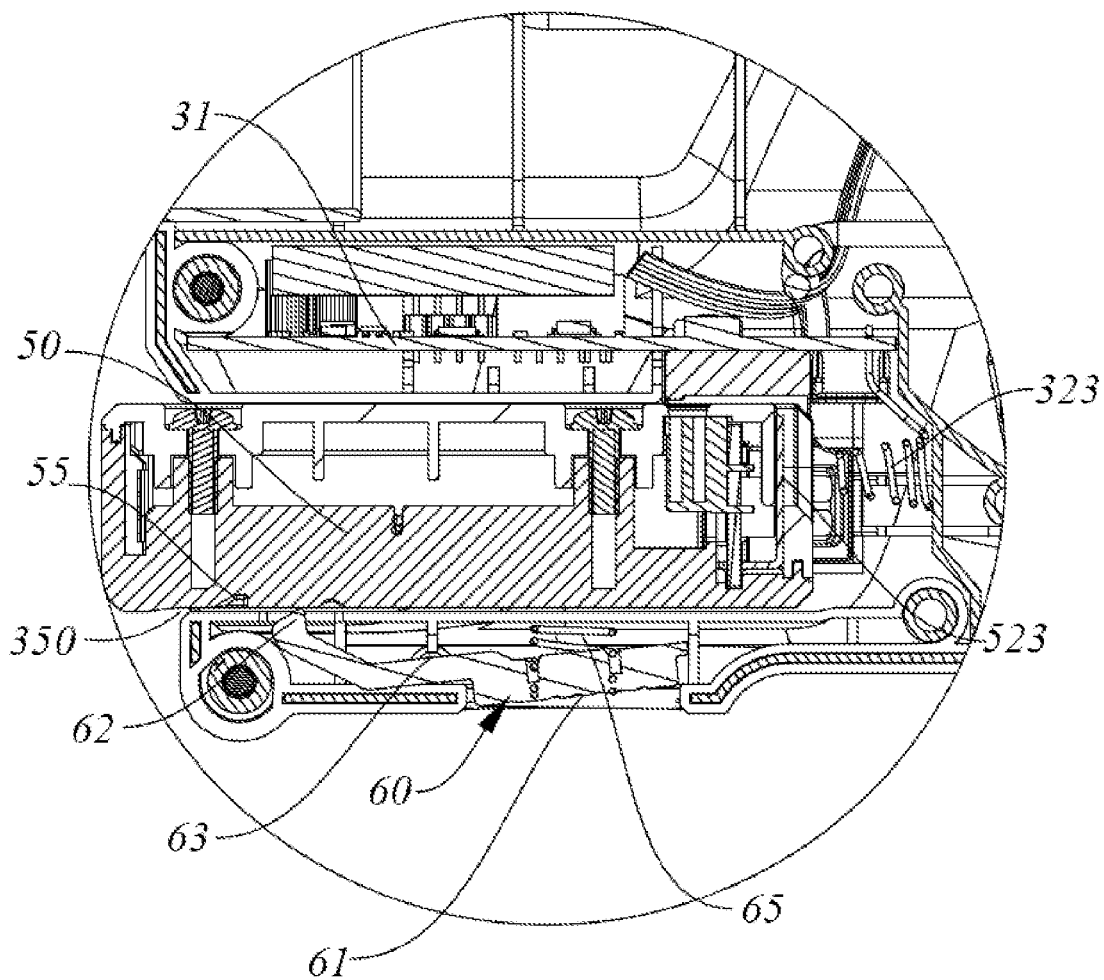
FIG. 14 is an enlarged schematic view of portion b of FIG. 13.

Referring to FIGS. 13 and 14, when the battery pack 50 needs to be dismounted, a force is inwardly applied to the pressing portion 61, the pressing portion 61 overcomes the acting force of the reset member 65 and pivots under the action of the rotating shaft 63 to drive the hook portion 62 to be separated from the groove portion 55, so that the battery pack 50 is unlocked relative to the cavity 35, and in order to facilitate taking out the battery pack, an elastic member is provided on the rear wall of the cavity 35, the battery pack 50 is mounted in the cavity, and the elastic member is compressed; when the battery pack 50 is unlocked, the elasticity of the elastic member is released, namely, under the action of the elastic member, the battery pack 50 is popped out of the cavity 35, so that the battery pack can be dismounted by one hand. Preferably, in the present embodiment, the cavity third terminal 323 and the elastic member may be constructed as the same member, such as a spring, so that the assembly is convenient to reduce the cost. Of course, the elastic member and the cavity third terminal 323 may be separately provided according to actual requirements.

In addition, when the battery pack 50 is not mounted, the hook portion 62 protrudes into the cavity 35 under the action of the reset member 65, in order to achieve the mount of the battery pack with one hand, one surface of the hook portion 62 facing the opening 350 of the cavity 35 is configured as a guiding surface, the guiding surface can be a slope, an arc surface or a curved surface and the like which can make the force of the battery pack 50 moving into the cavity 35 generate a downward component force, with the movement of the battery pack 50 into the cavity 35, the hook portion 62 moves outwards and drives the pressing portion 61 to overcome the action of the reset member 65 through the rotating shaft 63, the battery pack 50 is smoothly mounted into the cavity 35, and when the groove portion 55 corresponds to position of the hook portion 62, the hook portion 62 is clamped into the groove portion 55 under the action of the reset member 65 to lock the battery pack 50. In the present embodiment, the reset member 65 is preferably a compression spring, one end of which abuts against the housing and the other end of which abuts against the pressing portion. Certainly, the compression spring can also be provided as an abutting hook portion, and the reset member can also be provided as a torsional spring, and the torsional spring can be sleeved on the rotating shaft, one end is fixed relative to the housing, and the other end abuts against the pressing portion or the hook portion.

It can be seen from the above description that, according to the disclosure, the battery pack is mounted to the control panel unit, so that the battery pack is fixed relative to the substrate, and is not affected by vibration when using the tool, therefore the battery pack and the control panel unit can be protected, and tool failure caused thereby can be prevented from being unavailable, and the battery pack has a compact mounting structure, and can also be disassembled and assembled by one hand, so that it is more convenient for users. Through arranging the battery pack mounting structure at the handle assembly, and also arranging the operating portion at the handle assembly, the operation of the tool can be carried out when be gripped, and the battery pack, the control panel unit and the operating portion are arranged together, so that the trouble of wiring is reduced, and the assembling is more simple and convenient, the cost is low and the use is reliable. Through arranging the handle assembly between the working mechanism and the power mechanism, the battery pack and the control panel unit can be protected from the vibration of the power mechanism and the resulting heat, and the handle assembly is located at the front of the power mechanism, and the opening of the cavity where the battery pack is mounted faces the working mechanism when mounting, so that it will not be affected by the waste gas produced by that power mechanism, thereby reducing the failure of the garden tool caused by the vibration and heat, so as to make the use more reliable and the services life of the garden tool longer.

In the present embodiment, a grass trimmer is taken as an example for explanation, but other garden tools, such as a brush cutter, an edge trimmer, a chain saw, a pruning shear, etc., are also possible.

Embodiment 2

As shown in FIGS. 15 to 36, the present embodiment is described by taking an electric starting gasoline blowing-suction machine as an example. In autumn, there are often a lot of scattered fallen leaves, which brings a great deal of problem for the environment of family courtyard, especially after raining, the leaves are mixed with muddy water and pasted on the ground, bringing a lot of trouble for cleaning. The electric starting gasoline blowing-suction machine of the embodiment is an equipment capable of cleaning courtyards or surrounding environments, the working principle of which is that an engine of a gasoline engine is started through working of a battery, the engine enables a crankshaft to rotate at a high speed and drives an impeller to rotate, and therefore air suction or air blowing is generated, and the purpose of cleaning is achieved.

Figure 15:
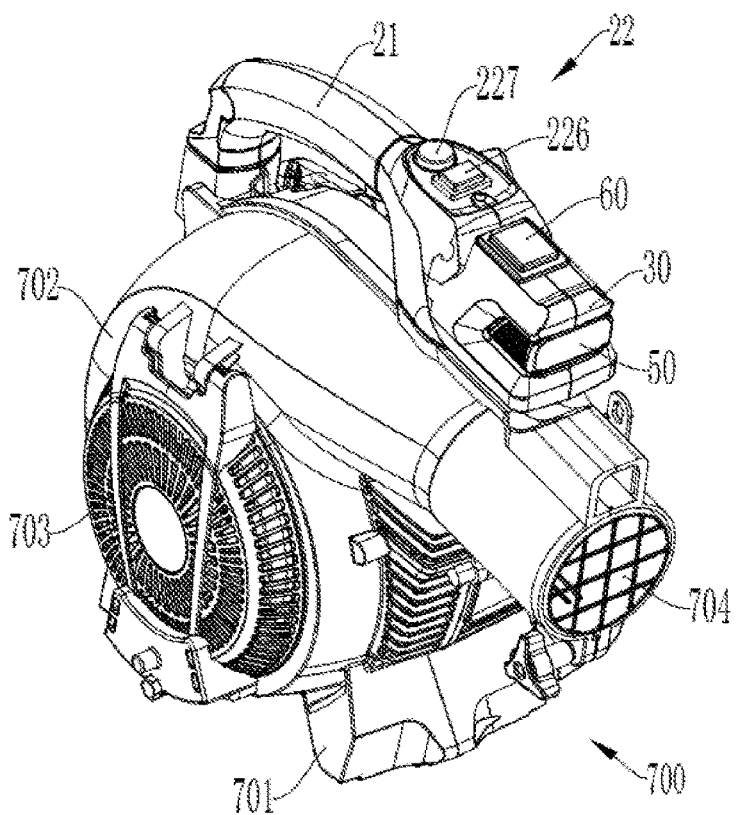
FIG. 15 is a schematic view of a blowing-suction machine in accordance with preferred Embodiment 2 of the present disclosure.
Figure 16:
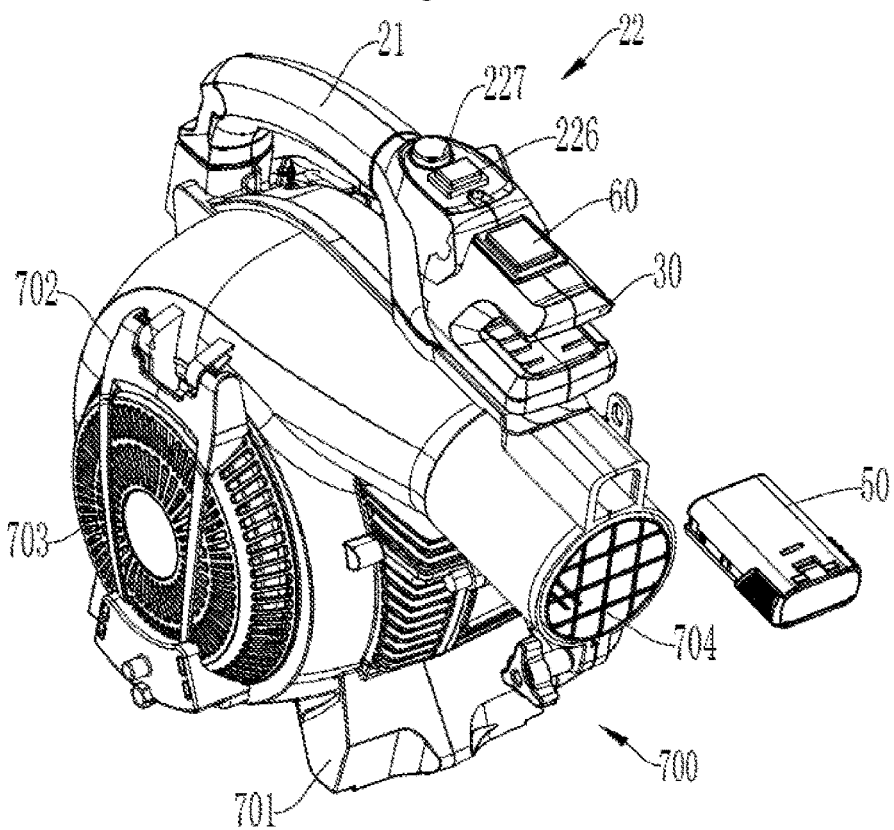
FIG. 16 is a state view of the battery pack being separated from the body of the blowing-suction machine in FIG. 15.

Specifically, as shown in FIGS. 15 and FIG. 16, the blowing-suction machine 700 includes a machine body 701 which is provided with an working mechanism and a power mechanism, wherein the working mechanism includes a volute 702 and an impeller disposed in the volute 702, an air inlet 703 is disposed on one side of the volute 702, and an air outlet 704 is disposed at the front portion of the volute 702. In the present embodiment, the working mechanism of the blowing-suction machine 700 includes a centrifugal fan, and the air outlet direction of the air outlet 704 is perpendicular to the air inlet direction of the air inlet 703; in other embodiments, the working mechanism of the blowing-suction machine 700 may also be an axial-flow fan, and the air outlet direction of the air outlet 704 is parallel to the air inlet direction of the air inlet 703. The above mentioned power mechanism comprises a gasoline engine and a starting motor, wherein the gasoline engine provides power for the working mechanism, and the starting motor is used for realizing the electric starting of the gasoline engine. In the present embodiment, the power is provided by the gasoline engine to make the power of the blowing-suction machine strong, so that the blowing-suction machine can be used outdoors for a long time; of course, the power mechanism may be a motor, and a rechargeable battery pack, an AC power supply, or the like for supplying power to the motor. Further, the machine body 701 is provided with a handle assembly 20 which comprises a housing, and the housing is provided with a gripping portion 21, an operating portion 22 and a battery mounting portion, wherein the gripping portion 21 extends in the air outlet direction, and the gripping portion 21 is provided with a handle rubber coating to make a user can grip conveniently; the operating portion 22 is positioned at the front end of the gripping portion 21, and the operating portion 22 is provided with an activating switch 226 for activating the blowing-suction machine and a starting switch 227 for starting the operation of the blowing-suction machine; the battery mounting portion 30 is disposed at one end of the housing close to the air outlet 704 and located obliquely below the operating portion 22, a battery pack 50 is detachably mounted on the battery mounting portion 30, and the battery pack 50 is used for supplying power to the starting motor. In addition, the battery pack 50 can also supply power to an electronic control system of the gasoline engine, such as an electronic ignition system, an electronic fuel injection system, an electronic throttle system, an automatic throttle system, and the like. Still further, the battery pack 50 may also be charged while the gasoline engine is operating.

The starting process of the blowing-suction machine is as follows: the battery pack 50 provides direct current power supply for the starting motor, the starting motor rotates at high speed to drive the gear assembly in the machine body 701 to rotate, the gear assembly continuously applies pressure to the scroll spring in the machine body 701, namely, the scroll spring continuously stores kinetic energy of the starting motor, once the elastic force provided by the scroll spring is larger than the resistance of the crankshaft in the machine body 701, the scroll spring releases energy to the crankshaft through the clutch mechanism, so that the crankshaft is driven to rotate, and the electric starting process of the gasoline engine is realized. Once the gasoline engine is started, the crankshaft rotates at a high speed to drive the impeller to work, and meanwhile, the clutch mechanism is separated to stop the speed reducing mechanism.

It should be noted that the specific structure of the handle assembly 20 provided in the present embodiment is similar to the structure of the handle assembly 20 in Embodiment 1, and the same parts will not be described again in the present embodiment, and only the differences will be described below.

Figure 17:
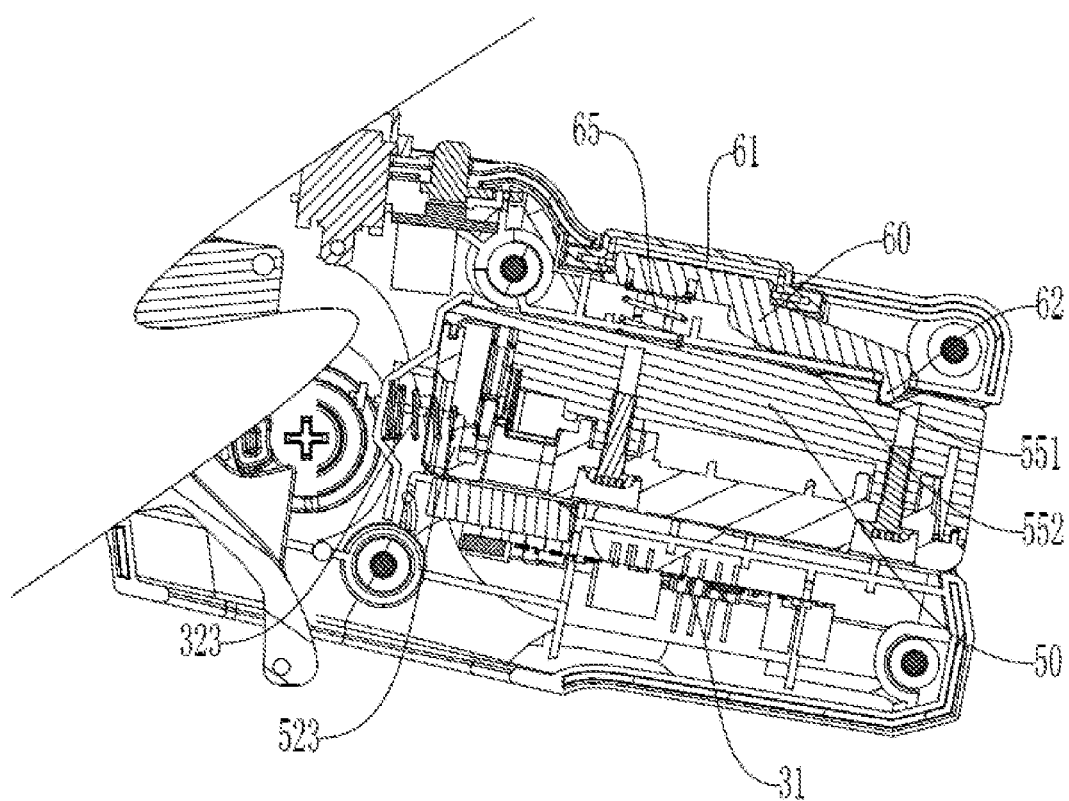
FIG. 17 is a partial sectional view of the battery pack and the battery mounting portion in FIG. 15 (a state in which the hook portion is caught in the first groove)
Figure 18:
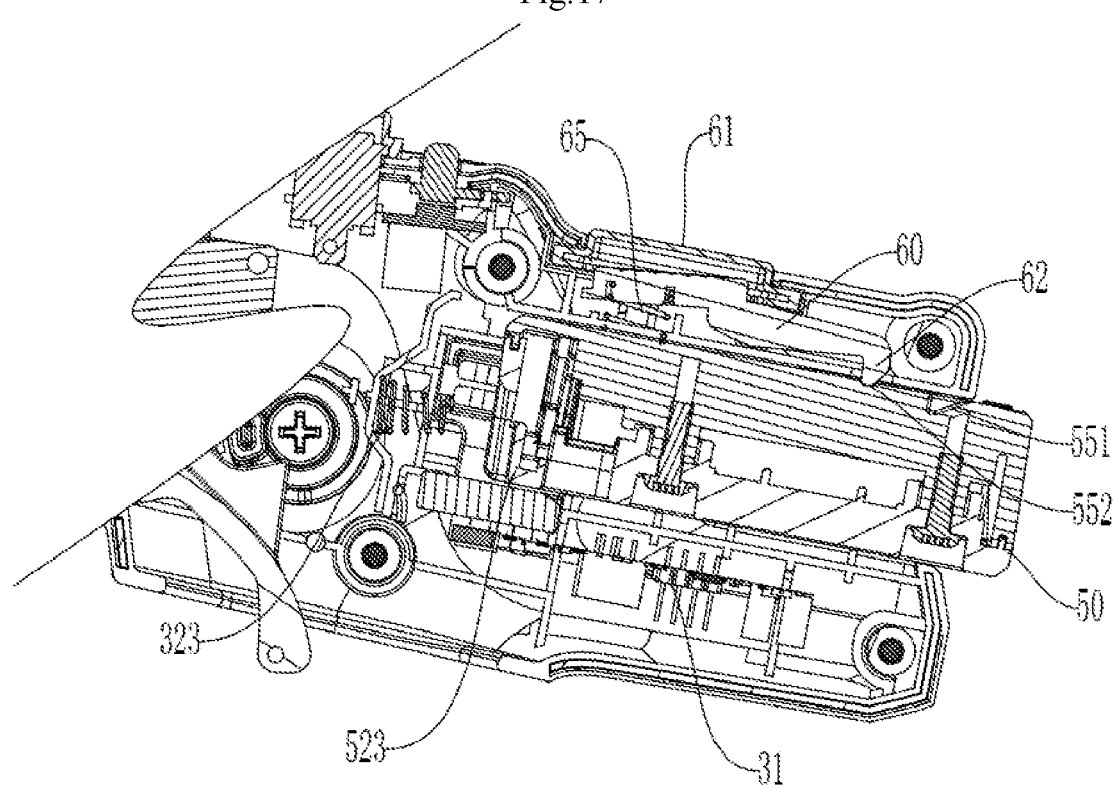
FIG. 18 is a partial sectional view of the battery pack and the battery mounting portion in FIG. 15 (a state in which the hook portion is caught in the second groove)
Figure 19:
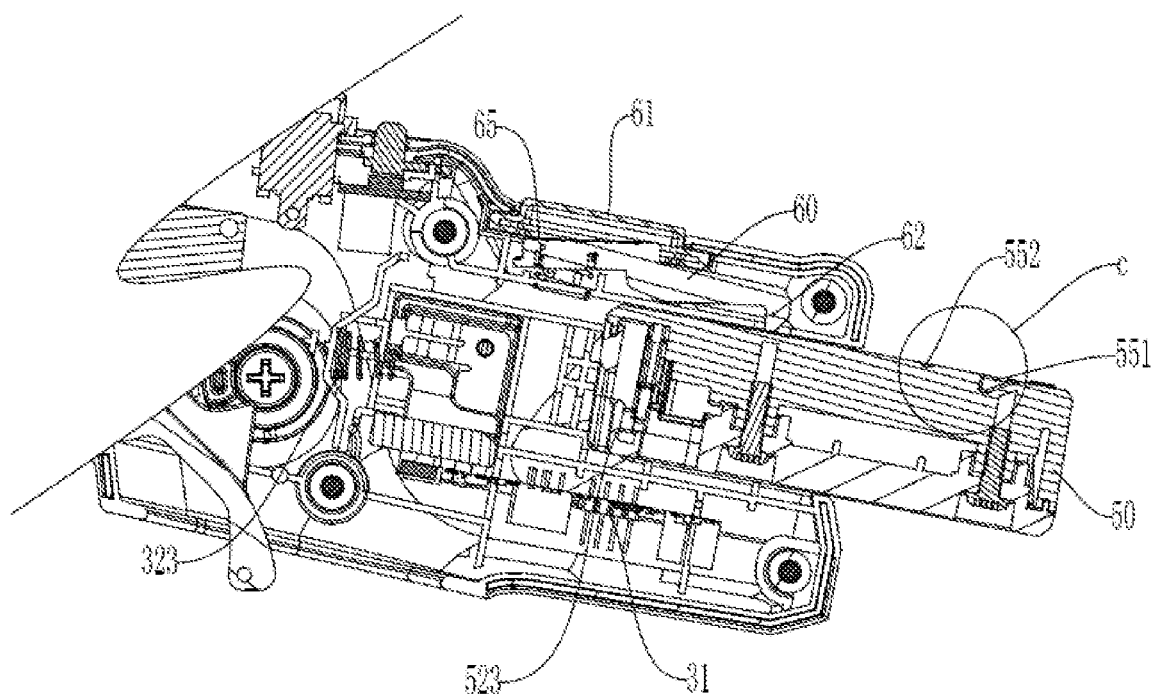
FIG. 19 is a partial sectional view of the battery pack and the battery mounting portion in FIG. 15 (a state in which the battery pack is drawn out of the cavity)

In the present embodiment, the cavity 35 and the control panel unit are both disposed above the air outlet 704 and below the operating portion 22. The cavity 35 is disposed in the battery mounting portion 30, and the battery pack 50 can be inserted into the cavity 35 or popped of the cavity 35 along the extension direction of the gripping portion 21. However, the existing battery pack mounting structure has no buffer when popping up, and if a user cannot grip the battery pack 50 in time in the process of popping up the battery pack 50, the battery pack 50 is easily dropped and damaged, and therefore, the battery pack 50 in the present embodiment is provided with a pop-up buffer structure, so that the battery pack can be effectively prevented from being popped up at one time. Specifically, as shown in FIGS. 17-19, in the present embodiment, the groove portion 55 is provided as a first groove 551 and a second groove 552, wherein the first groove 551 is relatively far away from the battery third terminal 523, the second groove 552 is relatively close to the battery third terminal 523, and both the first groove 551 and the second groove 552 can cooperate with the hook portion. Here, the depth of the first groove 551 is greater than that of the second groove 552, so that when the hook portion 62 is clamped into the first groove 551, the battery pack 50 can be locked relative to the cavity 35, and at this time, the battery pack 50 cannot be drawn out from the cavity 35; when the battery pack 50 is unlocked relative to the cavity 35, the battery pack 50 is popped out of the cavity 35, the hook portion 62 can be clamped into the second groove, and the battery pack 50 can be manually drawn out by the user.

Figure 20:
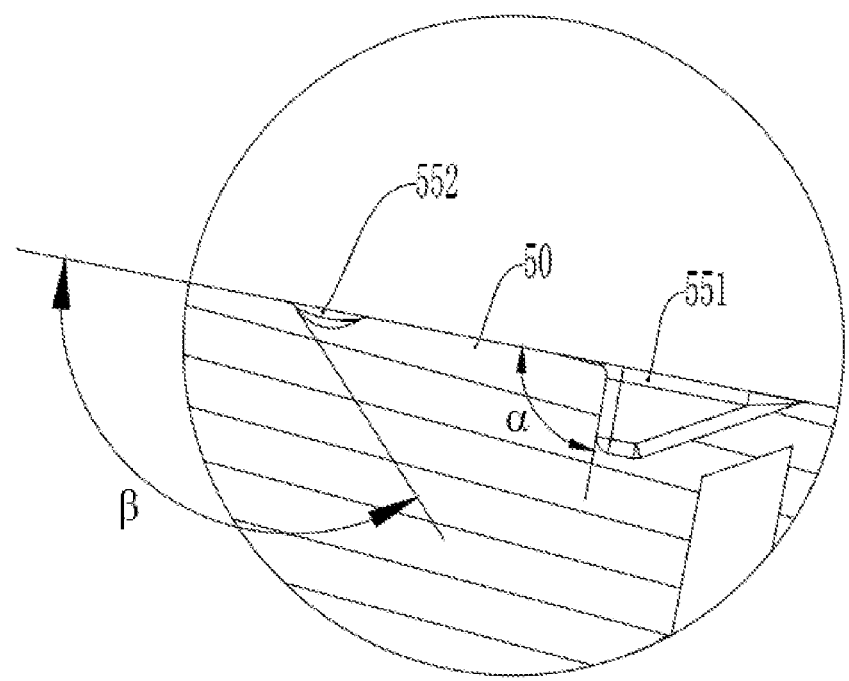
FIG. 20 is an enlarged schematic view of portion c of FIG. 19.
Figure 21:
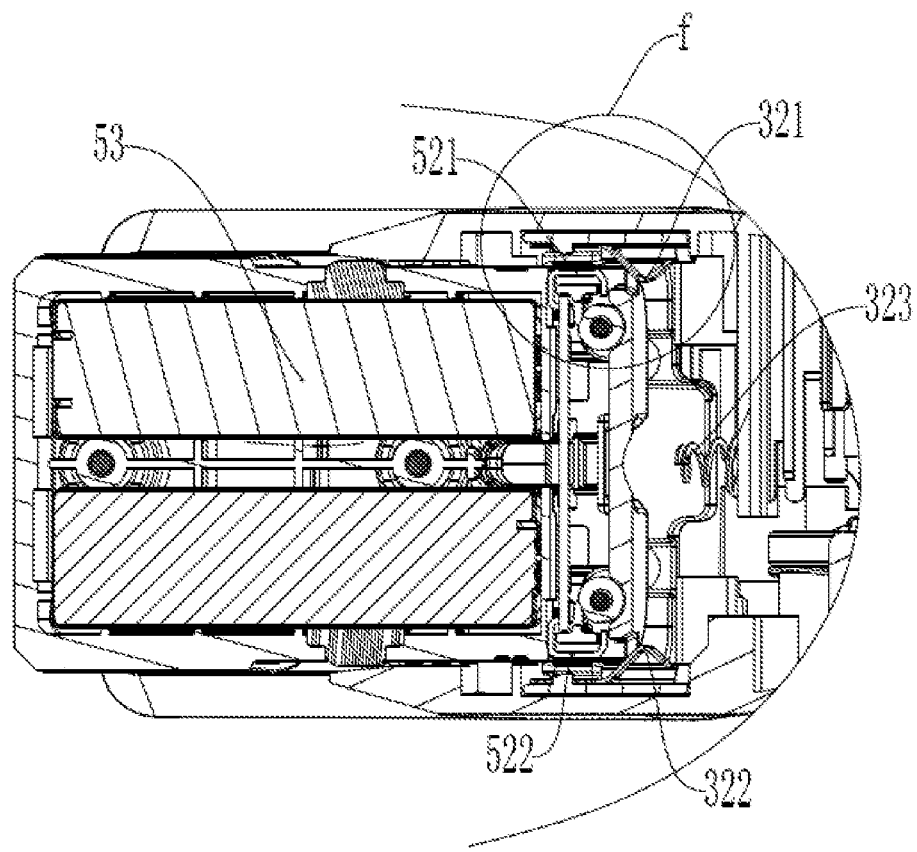
FIG. 21 is a partial cross-sectional view from another perspective of the battery pack and battery mounting portion of FIG. 15.

Further, as shown in FIG. 20, the side wall of the first groove 551 away from the protruding end of the battery pack 50 is a plane, the included angle α between this side wall and the top side surface 507 of the battery pack 50 is not greater than 90°, or this side wall is a curved surface, then the minimum included angle between the tangent plane of this side wall and the top side surface 507 of the battery pack 50 is not greater than 90°; this arrangement can ensure the clamping connection of the hook portion 62 and the first groove 551, and prevent the battery pack from slipping; for example, as shown in FIG. 20, the angle between the front portion of the first groove 551 and the top side surface 507 of the battery pack may be set to an acute angle, and the angle between the rear portion of the first groove 551 and the top side surface 507 of the battery pack may be set to an acute angle. The side wall of the second groove 552 away from the protruding end of the battery pack 50 is a plane, the included angle β between this side wall and the top side surface 507 of the battery pack 50 is not less than 120°, or this side wall is a curved surface, then the maximum included angle between the tangent plane of this side wall and the top side surface 507 of the battery pack 50 is not less than 120°; in case of this arrangement, on one hand, the battery pack 50 can be clamped in the cavity 35 and cannot fall off, and on the other hand, an operator can draw out the battery pack 50 from the cavity 35 by applying a certain action; for example, as shown in FIG. 20, the angle between the front portion of the second groove 552 and the top side surface 507 of the battery pack may be set to an acute angle, and the angle between the rear portion of the second groove 552 and the top side surface 507 of the battery pack may be set to an obtuse angle.

The working process of the pop-up buffer structure in the present embodiment is as follows: when the battery pack 50 needs to be detached, a force is inwardly applied to the pressing portion 61, the pressing portion 61 overcomes the acting force of the reset member 65, and meanwhile, the pressing portion 61 pivots under the action of the rotating shaft 63 to drive the hook portion 62 to be separated from the first groove 551, so that the battery pack 50 is unlocked relative to the cavity 35; when the battery pack 50 is unlocked, the elastic force of the elastic member on the rear wall of the cavity 35 is released, that is, the battery pack 50 is popped out of the cavity 35 under the action of the elastic member, the second groove 552 on the battery pack 50 is clamped with the hook portion 62 in the popping process, so that the battery pack 50 is prevented from being completely separated from the cavity 35, and then the user can manually pull out the battery pack 50 from the cavity 35.

Figure 22:
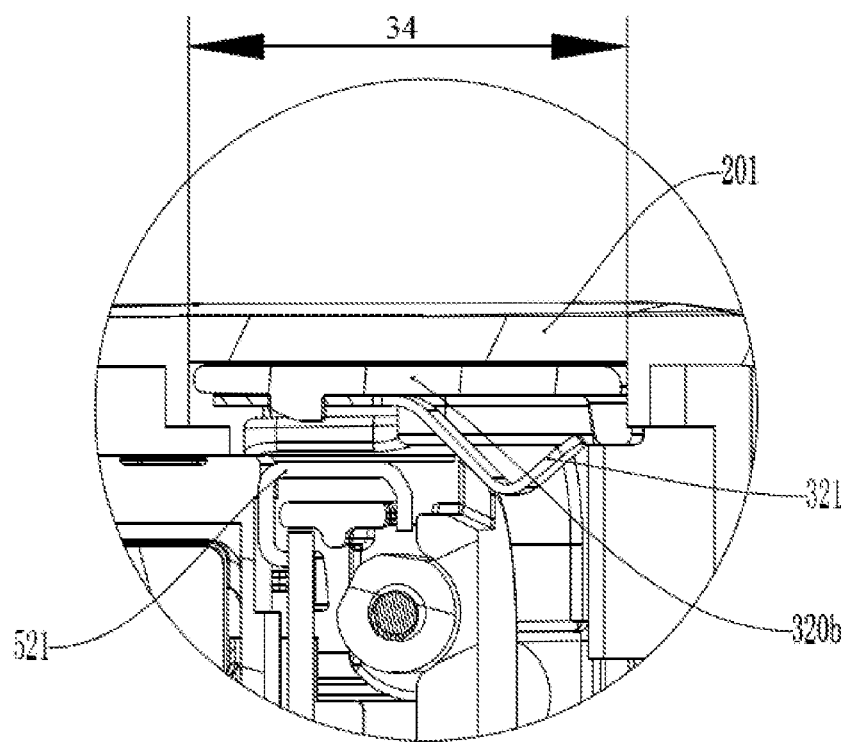
FIG. 22 is an enlarged schematic view of portion f of FIG. 21.
Figure 23:
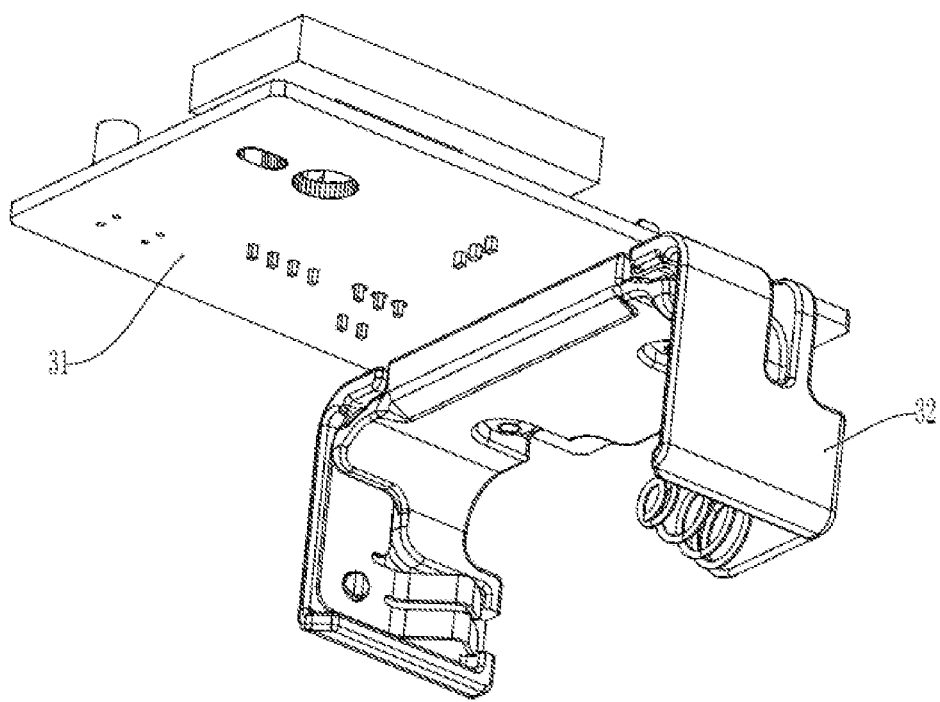
FIG. 23 is an assembly view of the substrate and the electrode holder according to preferred Embodiment 2 of the present disclosure.
Figure 24:
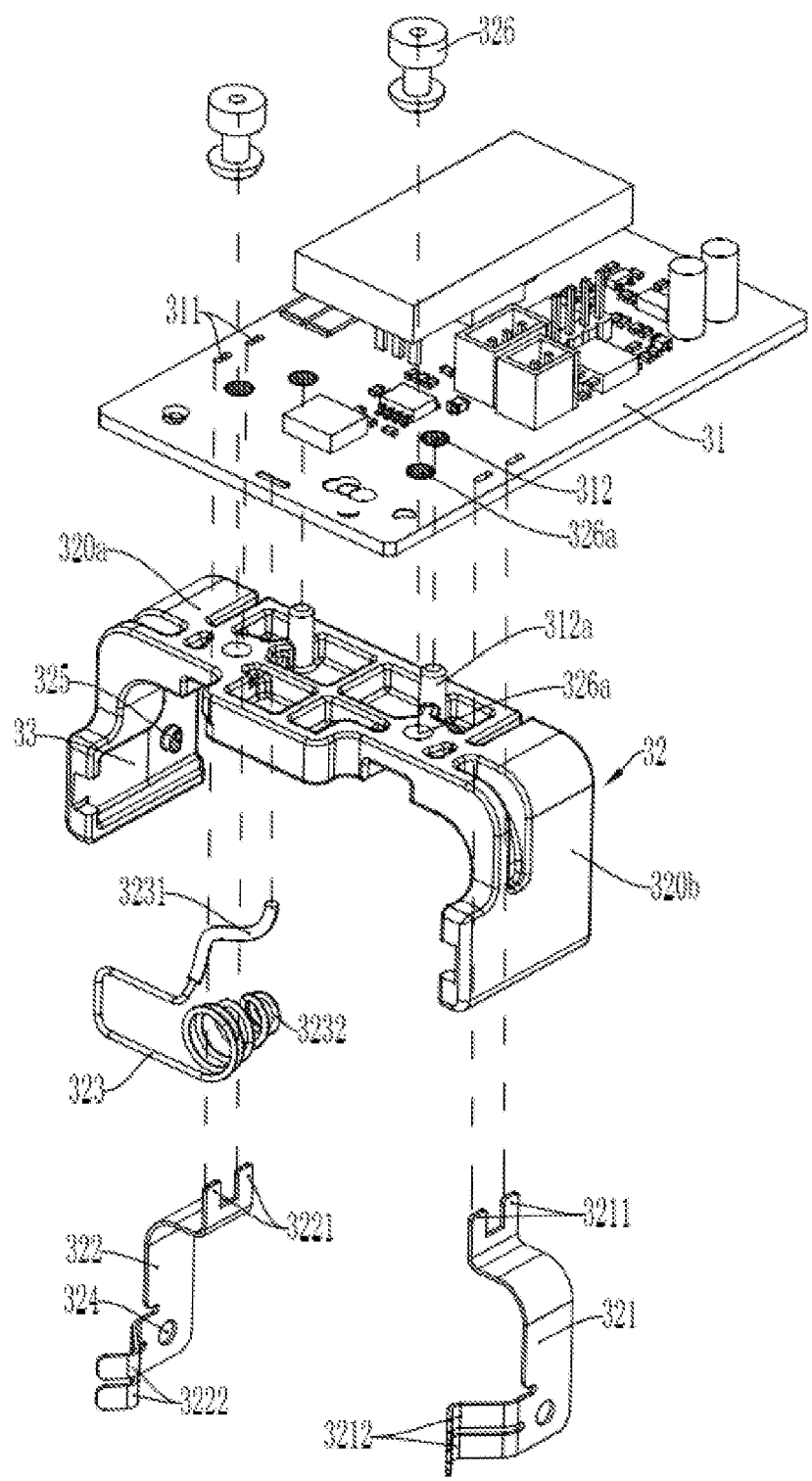
FIG. 24 is an exploded view of the substrate and the electrode holder according to preferred Embodiment 2 of the present disclosure.
Figure 25:
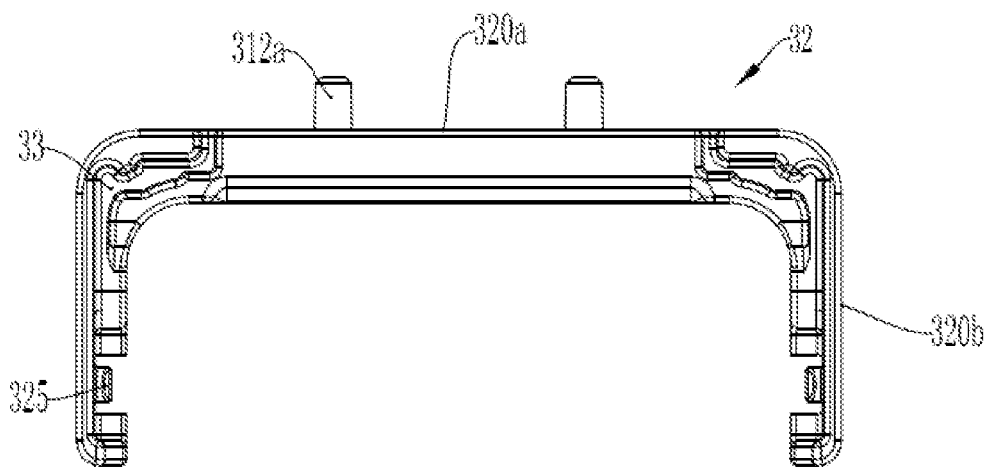
FIG. 25 is a front view of the electrode holder according to preferred Embodiment 2 of the present disclosure.
Figure 26:
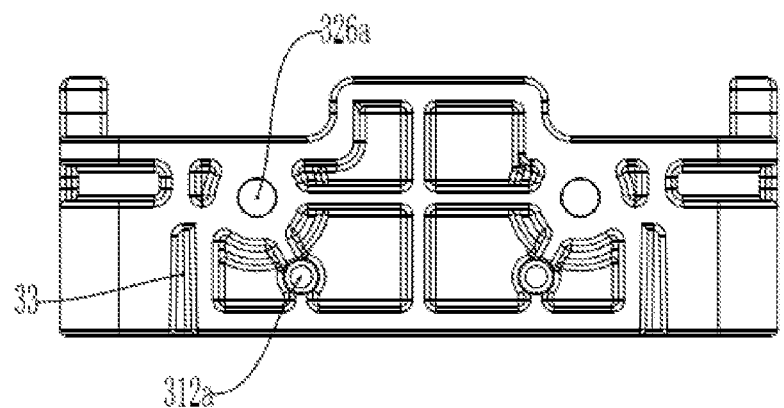
FIG. 26 is a top view of the electrode holder according to preferred Embodiment 2 of the present disclosure.

Further, due to the characteristic of the insertion direction of the battery pack 50, in the process of inserting the battery pack 50 into the cavity 35, the left and right sides of the battery pack 50 generate a force along the insertion direction of the battery pack 50 to the clamping pin first terminal 321 and the clamping pin second terminal 322, so that the electrode holder 32 is easy to loosen, and meanwhile, in the process of inserting and pulling the battery pack 50 for multiple times, welding spots between the clamping pin first terminal 321, the clamping pin second terminal 322 and the substrate 31 are easy to damage and loosen. Therefore, the present embodiment further improves the control panel unit and the mounting structure thereof. The details are as follows:

as shown in FIGS. 21 to 26, the control panel unit includes a substrate 31, an electronic element disposed on the upper surface of the substrate 31, and an electrode holder 32 disposed on the lower surface of the substrate 31, the electrode holder 32 having a body 320a fixed to the substrate 31 and clamping pins 320b extending downward along both ends of the body 320a. As shown in FIG. 22, in the present embodiment, the electrode holder 32 is mounted in a housing 201, the housing 201 is internally provided with a recess portion 34, and the two clamping pins 320b of the electrode holder 32 are clamped in the recess portion 34, so as to further prevent the electrode holder 32 from shaking during the inserting and pulling of the battery pack 50. The two clamping pins 320b of the electrode holder 32 extend into the cavity 35, the clamping pin first terminal 321 is mounted on the clamping pin 320b at one end, the clamping pin second terminal 322 is mounted on the clamping pin 320b at the other end, and the battery pack 50 is mounted in the cavity 35 and electrically connected with the clamping pin first terminal 321 and the clamping pin second terminal 322. Further, the electrode holder 32 of the present embodiment is an integrated structure, in which the body 320a and the clamping pins 320b at two ends thereof form a "U" shape, and this arrangement enables the battery first terminal 521 and the battery second terminal 522 on the battery pack 50 to be respectively and correspondingly tightly connected with the clamping pin first terminal 321 and the clamping pin second terminal 322 at two sides of the electrode holder 32, so as to improve the connection reliability; on the other hand, the U-shaped structure has an elastic shock-absorbing effect, and prevents the battery pack 50 from being disconnected from the control panel unit due to vibration during use. Meanwhile, the above mentioned integral U-shaped structure can meet the requirement of better safety performance by using the least materials, so that the material cost is saved. Preferably, the electrode holder 32 of the present embodiment is made of flame retardant materials, such as plastic, rubber, and glass, so as to ensure that the electrode holder 32 has good flame retardant property.

In the present embodiment, the clamping pin first terminal 321 and the clamping pin second terminal 322 are respectively provided with a first fixing member 324, the clamping pins 320b at two ends of the body 320a are respectively provided with a terminal mounting slot 33, and each terminal mounting slot 33 is provided with a second fixing member 325. Through the cooperation of the first fixing members 324 and the second fixing members 325, the clamping pin first terminal 321 and the clamping pin second terminal 322 are firmly fixed on the clamping pin 320b, thereby preventing the two terminals from shaking under the acting force of battery pack 50. Preferably, the above mentioned first fixing members 324 are positioning holes formed at the bottom of the clamping pin first terminal 321 and the clamping pin second terminal 322, and the second fixing members 325 are positioning posts protruding from the inner sides of the clamping pins 320b, so that the reliability of terminal fixing is ensured and the convenience of mounting is improved by the matching between the positioning holes and the positioning posts. The upper end of the above mentioned clamping pin first terminal 321 is provided with a first electrode inserting piece 3211, the upper end of the clamping pin second terminal 322 is provided with a second electrode inserting piece 3221, the electrode holder 32 is provided with a through hole for the clamping pin first terminal 321 and the clamping pin second terminal 322 to pass through, and the substrate 31 is provided with an electrode hole 311 at the position corresponding to the clamping pin first terminal 321 and the clamping pin second terminal 322. The first electrode inserting piece 3211 and the second electrode inserting piece 3221 respectively penetrate through the corresponding through holes and electrode holes 311 and then are connected to the substrate 31 by welding, and the positioning accuracy of the electrode inserting pieces is improved due to this arrangement. In order to improve the welding strength, the shapes of the first electrode inserting piece 3211 and the second electrode inserting piece 3221 are preferably in a fishfork shape, and the fishfork shaped structure can be welded to the substrate 31 at two points through two fork legs, so that the welding between the electrode inserting pieces and the substrate is firmer. The lower end of the clamping pin first terminal 321 is provided with a first contacting piece 3212 for abutting against the battery first terminal 521; the lower end of the clamping pin second terminal 322 has a second contacting piece 3222 for abutting against the battery second terminal 522.

Further, the body 320a of the electrode holder 32 is fixedly connected to the substrate 31 by a third fixing element 326, in the present embodiment, the third fixing element 326 is preferably a rivet, and the substrate 31 and the electrode holder 32 are provided with rivet holes 326a for inserting the rivet. The riveting connection mode ensures the firm and stable connection of the electrode holder 32 and the substrate 31. Further, a substrate positioning hole 312 may also be provided on the substrate 31, and a substrate positioning post 312a is provided at the top end of the electrode holder 32, so as to realize positioning of the electrode holder 32 and the substrate 31, and ensure mounting accuracy. In the present embodiment, the positioning between the substrate 31 and the electrode holder 32 is realized by the matching between the substrate positioning hole 312 and the substrate positioning post 312a, the fixing between the electrode holder 32 and the substrate 31 is realized by the matching between the rivet and the rivet hole 326a, and the electrode holder 32 is firmly fixed on the substrate 31 by the combined action of the rivet and the substrate positioning post 312a, so as to prevent the loosening of the electrode welding point during the inserting and pulling of the battery.

In the embodiment, the electrode holder 32 is fixed on the substrate 31 by fixing the clamping pin first terminal 321 and the clamping pin second terminal 322 on the electrode holder 32, so that the clamping pin first terminal 321 and the clamping pin second terminal 322 can keep the relative positions stable even when being subjected to the impact force of the battery pack 50, and the electrode inserting piece is prevented from shaking in the electrode hole 311 to cause the welding point to loosen. Furthermore, in the present embodiment, the cavity third terminal 323 is provided with a wire portion 3231 having a certain flexibility, the cavity third terminal 323 is connected to the substrate 31 through the wire portion 3231, and the wire portion 3231 can absorb vibration, so as to better solve the problem of solder joint looseness between the cavity third terminal 323 and the substrate 31 due to vibration. In addition, the cavity third terminal 323 is further provided with a spring portion 3232 which not only can serve as a functional component for popping up the battery pack 50, but also can serve as a functional component for signal transmission, so that the assembly of the device is facilitated, and the manufacturing cost is reduced.

In the present embodiment, as shown in FIGS. 27 to 36, the battery pack 50 is substantially hexahedral in shape, and includes a battery pack bottom side surface 508 and a battery pack top side surface 507 which are provided to face each other, a battery pack front side surface 503 and a battery pack rear side surface 504 which are provided to face each other, and a battery pack left side surface 505 and a battery pack right side surface 506 which are provided to face each other. The battery pack 50 includes a battery pack housing and battery cells 53 mounted in the battery pack housing. Specifically, the battery pack housing is formed by at least an upper cover 51 and a lower cover 52 that are connected in a snap-fit manner. It should be noted that, in the present embodiment, the bottom side surface 508 is disposed on the upper cover 51, and the top side surface 507 is disposed on the lower cover 52. The battery cells 53 are substantially cylindrical, and the battery cells 53 are mounted in the battery pack housing, wherein the axial directions of two battery cells 53 are arranged along the front-rear direction of the battery pack 50, the radial directions of the two battery cells 53 are arranged along the left-right direction of the battery pack 50, and the two battery cells 53 are arranged side by side along the left-right direction of the battery pack (that is, the axis of the battery cells 53 is consistent with the extension direction of the gripping portion 21, and the arrangement direction of the two battery cells 53 is perpendicular to the extension direction of the gripping portion 21), and this arrangement makes the battery pack 50 have a smaller thickness in the up-down direction. In addition, a battery control panel 57 is further provided in the battery pack housing behind the battery cells 50.

Figure 34:
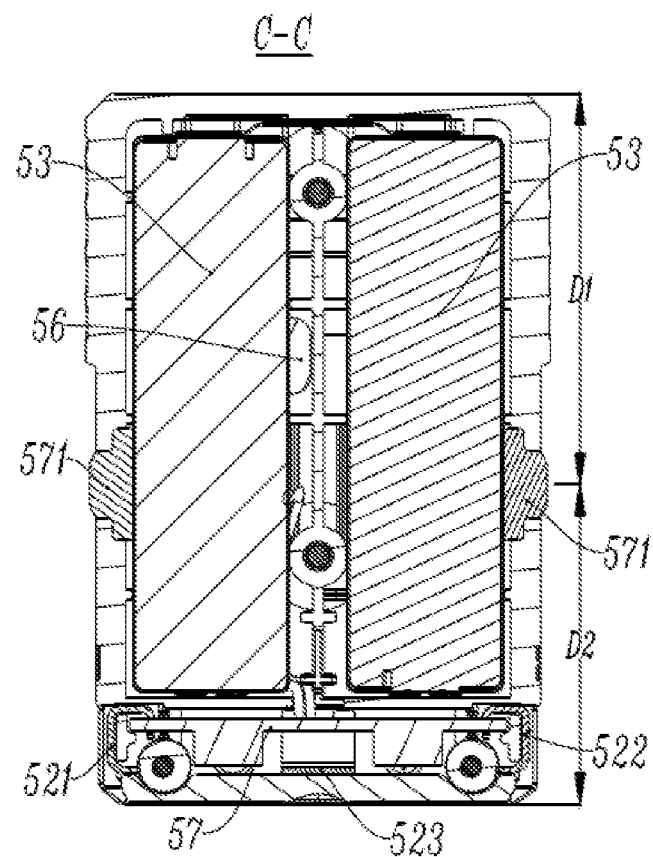
FIG. 34 is a cross-sectional view taken along direction C-C in FIG. 29.
Figure 35:
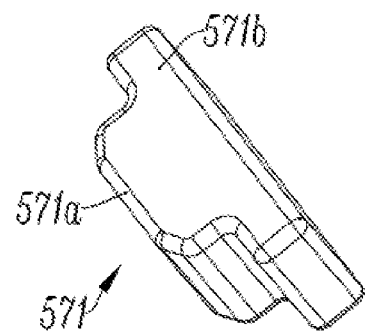
FIG. 35 is a schematic view of the first damping member according to preferred Embodiment 2 of the present disclosure.
Figure 36:
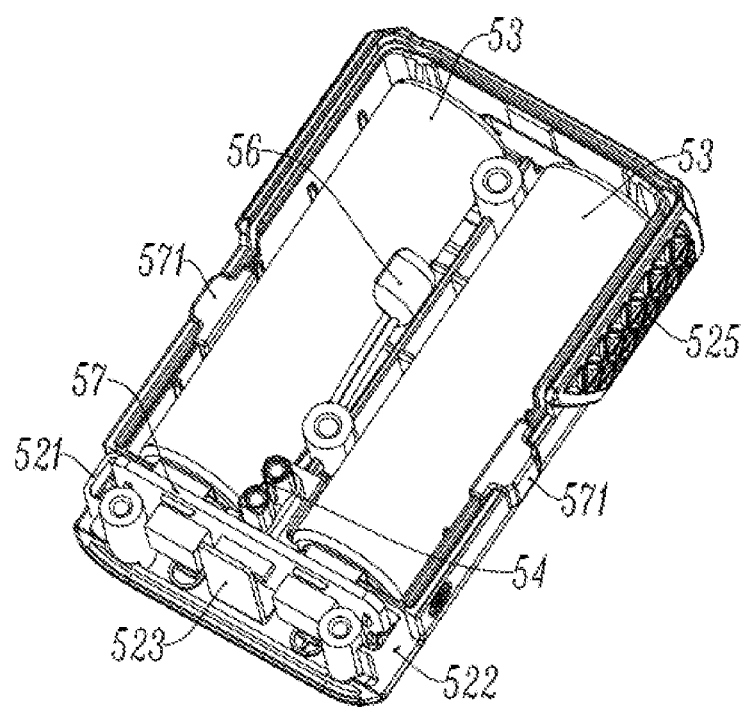
FIG. 36 is a schematic view of the battery pack without the upper cover according to preferred Embodiment 2 of the present disclosure.

In the present embodiment, referring to FIGS. 34 to 36, the battery pack 50 is provided with a discharging port and a charging port 54, the discharging port is specifically a battery first terminal 521 and a battery second terminal 522 which are arranged at the left and right sides of the battery pack 50, and the battery first terminal 521 and the battery second terminal 522 are both arranged near the rear portion of the battery pack 50 and are respectively electrically connected with the battery control panel 57. With the above arrangement, on one hand, the battery first terminal 521 and the battery second terminal 522 are respectively located at two sides of the battery pack 50, and since the distance between the two terminals is large, the two terminals are difficult to be in direct contact under an unintended condition, and short circuit between the battery first terminal 521 and the battery second terminal 522 is prevented to the maximum extent; on the other hand, since the battery control panel 57 is disposed at the rear portion of the battery pack 50, the battery first terminal 521 and the battery second terminal 522 can be directly drawn out from the left and right ends of the battery control panel 57, thereby avoiding complicated wiring. For the convenience of identification, a discharging negative electrode mark 521a is provided on the left side surface of the battery pack 50 near the battery first terminal 521; a discharging positive electrode mark 522a is provided on the right side surface of the battery pack 50 near the battery second terminal 522. In other embodiments, the positions of the battery first terminal 521 and the battery second terminal 522 may be switched according to actual situations.

Figure 27:
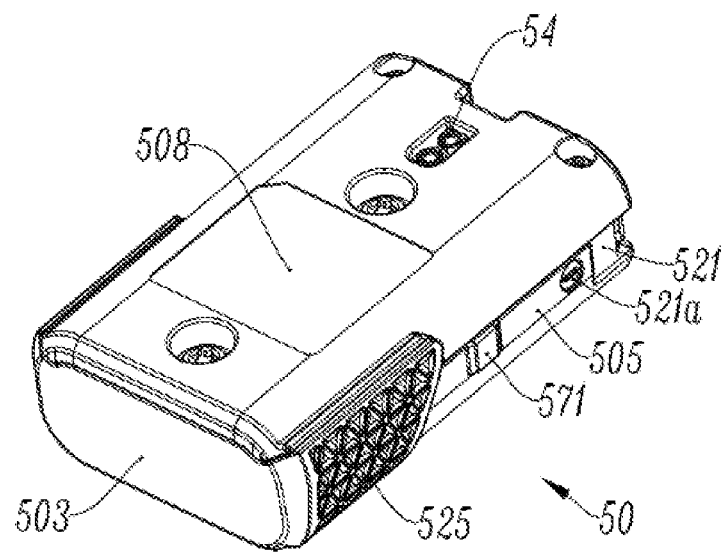
FIG. 27 is a schematic view of the battery pack according to preferred Embodiment 2 of the present disclosure.
Figure 30:
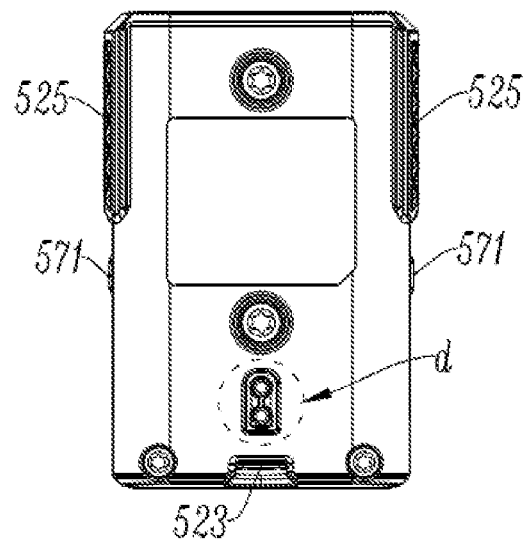
FIG. 30 is a bottom side view of the battery pack according to preferred Embodiment 2 of the present disclosure.
Figure 31:
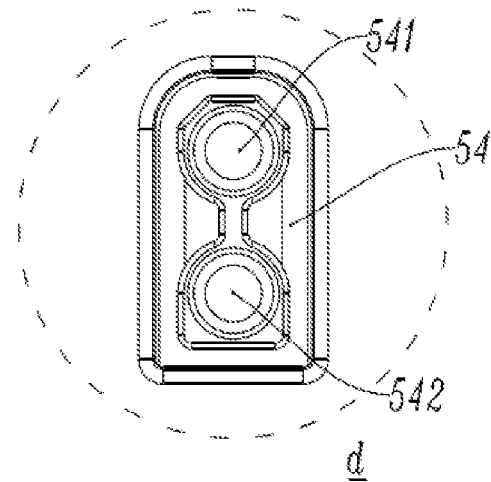
FIG. 31 is an enlarged schematic view of portion d of FIG. 30.

In the present embodiment, referring to FIGS. 27, 30 and 31, the charging port 54 is provided on the bottom side surface 508 of the battery pack 50. The charging port 54 includes a charging negative electrode port 541 and a charging positive electrode port 542 which are electrically connected to the battery control panel 57, respectively. Wherein, the charging negative electrode port 541 and the charging positive electrode port 542 are disposed at an interval, and the outer contour of the charging negative electrode port 541 is different from the outer contour of the charging positive electrode port 542. The charging terminal matched with the charging port 54 in an insertion mode has a charging positive terminal and a charging negative terminal which are arranged at an interval, and the outer contour of the charging positive terminal is different from the outer contour of the charging negative terminal. This design not only prevents the negative electrode and the positive electrode from being inserted reversely, but also effectively prevents the short circuit from occurring between the charging positive electrode port 542 and the charging negative electrode port 541. Further, the charging port 54 is located near the rear side 504 of the battery pack 50, such that the charging port 54 is located near the battery control panel 57, thereby avoiding complicated wiring.

Further, the battery pack 50 is further provided with at least one temperature sensor 56 electrically connected to the battery control panel 57, respectively. In the present embodiment, the temperature sensor 56 is disposed between the two battery cells 53, and is attached to the surface of any one of the battery cells 53. In other embodiments, each battery cell 53 is provided at least one temperature sensor 56 as needed, and the temperature sensors 56 are connected to the battery control panel 57 through wires. The rear side surface 504 of the battery pack 50 is provided with the battery third terminal 523, and since battery the third terminal 523 is close to the battery control panel 57, the battery third terminal 523 can be directly led out from the battery control panel 57, thereby avoiding complicated wiring. Correspondingly, the inner wall of the rear side of the cavity 35 is provided with a third cavity terminal 323 matched with the battery third terminal 523.

After the battery pack 50 is inserted into the cavity 35, the battery first terminal 521 and the battery second terminal 522 are respectively and correspondingly electrically connected with the clamping pin first terminal 321 and the clamping pin second terminal 322, so that the battery pack 50 is electrically connected with the starting motor through the control panel unit and the cable assembly to supply power to the starting motor and other electronic components; the battery third terminal 523 is electrically connected to the control panel unit through the cavity third terminal 323, and the control panel unit directly controls or indirectly through the battery control panel 57 controls the operating parameters of the battery pack 50 through the temperature signal collected by the battery third terminal 523.

In the blowing-suction machine, the power assembly includes a gasoline engine, so that it is difficult to avoid large vibration during operation. If the fit clearance between the battery pack 50 and the cavity 35 is designed to be very small, the battery pack 50 can be prevented from shaking relative to the cavity 35, so that the abrasion of the discharging port of the battery pack is avoided, but the problem that the battery pack 50 is difficult to insert and pull is caused. If the fit clearance between the battery pack 50 and the cavity 35 is not designed to be small enough, the battery pack 50 can be inserted and pulled smoothly, but the service life of the battery pack 50 is seriously affected by the abrasion of the discharging port of the battery pack.

In view of the above, the battery pack 50 further includes a vibration damper made of an elastic material in the present embodiment. As shown in FIGS. 27 to 36, in order to absorb the vibration of the battery pack 50 in the cavity 35 along the left-right direction, the left side surface of the battery pack 50 and the right side surface of the battery pack 50 are respectively provided with at least two first vibration dampers 571; in order to absorb the vibration of the battery pack 50 along the up-down direction in the cavity 35, the top side surface 507 of the battery pack 50 is provided with at least one second vibration damper 572. Specifically, referring to FIGS. 34 and 35, two first vibration dampers 571 are symmetrically disposed at the left side surface of the battery pack 50 and the right side surface of the battery pack 50. Taking the first damping member 571 on the left as an example, the first damping member 571 is embedded in the left side surface of the lower cover 52, and includes a first outer end 571a at least partially protruding from the outer surface of the lower cover 52, and further includes a first inner end 571b at least partially protruding from the inner surface of the lower cover 52. The inner end surface of the first inner end 571b abuts against the battery cells 53; when the battery pack 50 is loaded into the cavity 35, the outer end face of the first outer end 571a abuts against the inner wall of the cavity 35, and at this time, the first vibration damper 571 is sandwiched between the inner wall of the cavity 35 and the battery cells 53. Further, the first outer end 571a is smaller than the first inner end 571b, which can ensure that the first vibration damper 571 will not fall off the battery pack 50. Furthermore, the distance between the first vibration damper 571 and the front side surface 503 of the battery pack 50 is D1, the distance between the first vibration damper 571 and the rear side surface 504 of the battery pack 50 is D2, and D1 and D2 are substantially equal, the values of D1/D2 can be set to be 1 to 1.5, and the preferable values of D1/D2 are 1.2 to 1.3.

Figure 28:
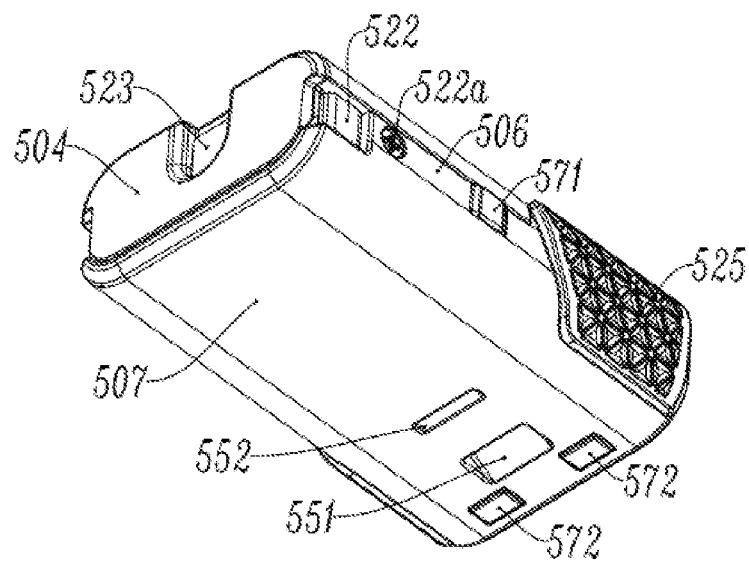
FIG. 28 is a schematic view from another perspective of the battery pack according to preferred Embodiment 2 of the present disclosure.
Figure 29:
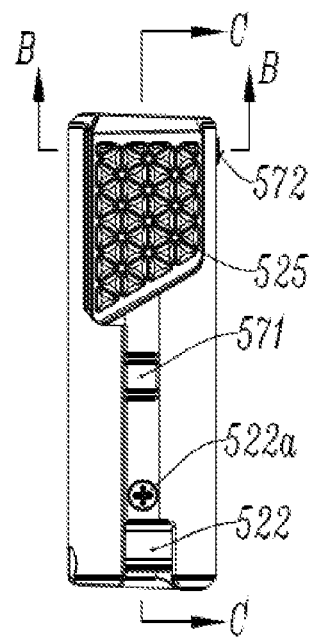
FIG. 29 is a right side view of the battery pack according to preferred Embodiment 2 of the present disclosure.
Figure 32:
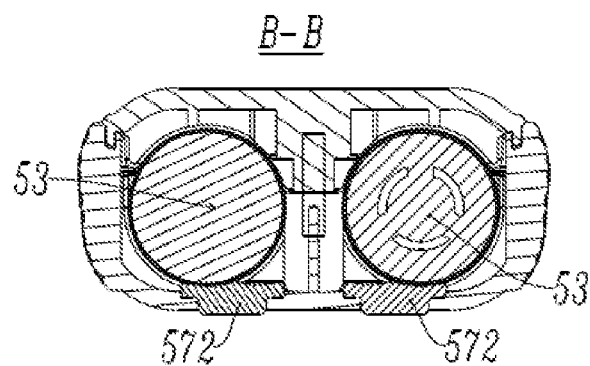
FIG. 32 is a cross-sectional view taken along direction B-B of FIG. 29.
Figure 33:
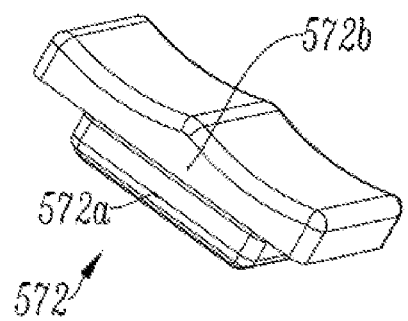
FIG. 33 is a schematic view of the second damping member according to preferred Embodiment 2 of the present disclosure.

Referring to FIGS. 28, 32 and 33, at least one second vibration damper 572 is embedded in the lower cover 52, and includes a second outer end 572a at least partially protruding from the outer surface of the lower cover 52, and further includes a second inner end 572b at least partially protruding from the inner surface of the lower cover 52. Further, the inner end surface of the second inner end 572b is provided with an arc surface corresponding to the radian of the outer surface of the battery cells 53. The arc surface abuts against the battery cells 53; when the battery pack 50 is mounted into the cavity 35, the outer end face of the second outer end 572a abuts against the inner wall of the cavity 35, and at this time, the second vibration damper 572 is sandwiched between the inner wall of the cavity 35 and the battery cells 53. Further, the second outer end 572a is smaller than the second inner end 572b, which can ensure that the second vibration damper 572 will not fall off the battery pack 50. Further, the second vibration damper 572 is disposed between the groove portion 55 and the rear side surface 504 of the battery pack 50. In the present embodiment, two second vibration dampers 572 are provided, and arc surfaces thereof are provided substantially directly below the two battery cells 53, respectively.

In the present embodiment, through providing the vibration dampers, under the situation of guaranteeing smooth insertion and pulling of the battery pack 50, the vibration of battery pack 50 in the course of the work is effectively reduced, thereby preventing that battery pack 50 from shaking relative to the cavity 35, and avoiding the wearing and tearing of the discharging port of the battery pack 50, so that the service life of the battery pack 50 is improved.

The present embodiment is described by taking a blowing-suction machine as an example, of course, the buffer pop-up structure of the battery pack 50 in the handle assembly 20 provided above in this embodiment, the connection structure between the electrode holder 32 and the substrate 31, the clamping pin first terminal 321, the clamping pin second terminal 322 and the cavity third terminal 323, the structure of the battery pack 50 itself, the mounting structure of the battery pack 50 and the cavity 35, and the specific arrangement of the charging port 54, the vibration damper, and the temperature sensor 56, can also be used in the grass trimmer in Embodiment 1 or other garden tools, such as a brush cutter, an edge trimmer, a chain saw, a pruning shear, etc.

It should be understood that although this specification is described according to embodiments, not every embodiment only includes an independent technical solution. This description of the specification is for clarity only, and those skilled in the art should treat the specification as a whole. The technical solutions in the embodiments may also be combined appropriately to form other embodiments that can be understood by those skilled in the art.

The above-listed detailed description is merely a detailed description of possible embodiments of the present disclosure, and it is not intended to limit the scope of the disclosure, and equivalent embodiments or modifications made without departing from the technical spirit of the present disclosure are intended to be included within the scope of the present disclosure.

The invention claimed is:

1. A handle assembly for a garden tool, the handle assembly comprising:
   a housing, the housing having a gripping portion defining an extension direction, the housing defining a cavity for detachably mounting a battery pack, the battery pack being configured to be inserted into the cavity along the extension direction of the gripping portion; and
   the housing further including an operating portion disposed at one end of the gripping portion close to the battery pack, the housing further internally including a control panel unit arranged below the operating portion, the control panel unit including a substrate and an electrode holder disposed on a lower surface of the substrate, the battery pack including at least two battery cells, axes of the at least two battery cells extending in a direction consistent with the extension direction of the gripping portion, and an arrangement direction of the at least two battery cells being perpendicular to the extension direction of the gripping portion, and two terminals are matched with the electrode holder to achieve electrical connection between the battery pack and the substrate, the terminals are respectively located on two sides of the battery pack side by side along the at least two battery cells.

2. The handle assembly according to claim 1, wherein the electrode holder has a body fixed on the substrate and clamping pins extending downward along two ends of the body, the clamping pins extending into the cavity, the battery pack being mounted in the cavity and matched with the clamping pins to achieve electrical connection with the control panel unit.

3. The handle assembly according to claim 2, wherein the electrode holder is mounted in the housing, the housing defines a recess portion, and both of the two clamping pins of the electrode holder are clamped in the recess portion.

4. The handle assembly according to claim 2, wherein the cavity defines an opening, a front cavity communicating with the opening, and an opposite rear cavity, the clamping pins being located in the rear cavity, the front cavity defining an opening portion communicating in a direction perpendicular to the mounting direction of the battery pack, the battery pack being mounted in the cavity, and a part of a side wall of the battery pack being exposed from the opening portion.

5. The handle assembly according to claim 4, wherein the side wall of the battery pack includes a rubber coating, and the rubber coating is exposed from the opening portion.

6. The handle assembly according to claim 2, wherein the clamping pins at the two ends of the body respectively include a clamping pin first terminal and a clamping pin second terminal both of which protrude towards the inside of the cavity, the terminals including a battery first terminal and a battery second terminal which are respectively matched with the clamping pin first terminal and the clamping pin second terminal, the battery first terminal and the battery second terminal being respectively arranged at two sides of an end portion of the battery pack.

7. The handle assembly according to claim 6, wherein one of the battery pack and a side wall of the cavity defines a guiding groove, the other of the battery pack and an inner wall of the cavity including a guiding protrusion, the battery pack being mounted in the cavity through the matching of the guiding groove and the guiding protrusion, one of the guiding groove or the guiding protrusion corresponding to the position of at least one of the battery first terminal and the battery second terminal.

8. The handle assembly according to claim 6, wherein a rear wall of the cavity defines a cavity third terminal, the end of the battery pack adjacent to the battery first terminal and the battery second terminal including a battery third terminal matched with the cavity third terminal, the control panel unit being connected to a detection module in the battery pack through the matching of the cavity third terminal and the battery third terminal.

9. The handle assembly according to claim 8, wherein one of a lower wall of the cavity and the battery pack includes a third guiding protrusion, the other of the lower wall of the cavity and the battery pack defines a third guiding groove matched with the third guiding protrusion, one of the third guiding protrusion or the third guiding groove corresponds to the position of the cavity third terminal or the battery third terminal.

10. The handle assembly according to claim 2, wherein the electrode holder is an integrated structure, and the body and the clamping pins at two ends thereof are arranged in a "U" shape.

11. The handle assembly according to claim 10, wherein the electrode holder includes a flame retardant material.

12. The handle assembly according to claim 6, wherein the clamping pin first terminal and the clamping pin second terminal respectively include a first fixing member, the clamping pins at two ends of the body respectively including a second fixing member matched with the first fixing member.

13. The handle assembly according to claim 12, wherein one of the first fixing member and the second fixing member defines a positioning hole, and the other is a positioning post.

14. The handle assembly according to claim 6, wherein the electrode holder and the substrate are fixedly connected by a third fixing member.

15. The handle assembly according to claim 14, wherein the third fixing member is a rivet.

16. The handle assembly according to claim 1, wherein the battery pack further includes a charging port, the charging port being disposed on a bottom side surface of the battery pack, a battery control panel being located in a housing of the battery pack, the charging port including a charging negative electrode port and a charging positive electrode port both of which are respectively electrically connected to the battery control panel, wherein the charging negative electrode port and the charging positive electrode port are disposed at an interval, and an outer contour of the charging negative electrode port is different from an outer contour of the charging positive electrode port.

17. The handle assembly according to claim 1, wherein a lower portion of the cavity includes a battery operating mechanism, the battery operating mechanism including an operating key and a reset member pressing against the operating key, the battery pack defining a groove portion matching with the operating key, the operating key being clamped with the groove portion under action of the reset member to lock the battery pack in the cavity.

18. A garden tool comprising:
a link assembly with two ends;
a working mechanism arranged at one end of the link assembly; and
a power mechanism arranged at the other end of the link assembly, the power mechanism including a gasoline engine, the gasoline engine having an electric starting system, the electric starting system having a starting motor;
the garden tool further including a handle assembly, the handle assembly having a housing, the housing including a gripping portion having an extension direction, the housing defining a cavity for detachably mounting a battery pack, the battery pack being configured to be inserted into the cavity along the extension direction of the gripping portion, the battery pack supplying power to the starting motor; and
the housing further including an operating portion disposed at one end of the gripping portion close to the battery pack, the housing further internally including a control panel unit arranged below the operating portion, the control panel unit including a substrate and an electrode holder disposed on a lower surface of the substrate, the battery pack including at least two battery cells, axes of the at least two battery cells extending in a direction consistent with the extension direction of the gripping portion, and an arrangement direction of the at least two battery cells being perpendicular to the extension direction of the gripping portion, and two terminals are matched with the electrode holder to achieve electrical connection between the battery pack and the substrate, the terminals are respectively located on two sides of the battery pack side by side along the at least two battery cells.

\* \* \* \* \*